United States Patent [19]

Gould

[11] 4,053,845

[45] Oct. 11, 1977

[54] OPTICALLY PUMPED LASER AMPLIFIERS

[76] Inventor: Gordon Gould, 329 E. 82 St., New York, N.Y. 10028

[21] Appl. No.: 498,065

[22] Filed: Aug. 16, 1974

Related U.S. Application Data

[60] Continuation of Ser. No. 644,035, March 6, 1967, abandoned, and Ser. No. 804,540, April 6, 1959, abandoned, said Ser. No. 644,035, is a division of Ser. No. 804,540, , and a continuation-in-part of Ser. No. 804,539, April 6, 1959.

[51] Int. Cl.$^2$ .......................... H01S 3/091; H01S 3/22
[52] U.S. Cl. ............................. 330/4.3; 331/94.5 G; 331/94.5 P
[58] Field of Search ................... 330/4.3; 331/94.5 G, 331/94.5 P, 94.5 D; 324/15 F

[56] References Cited

U.S. PATENT DOCUMENTS 2,929,922  3/1960  Schawlow et al. .................... 330/4.3

FOREIGN PATENT DOCUMENTS 148,441  1959  U.S.S.R. ................................ 330/4.3
123,209  1959  U.S.S.R. ................................ 330/4.3

OTHER PUBLICATIONS

Fabrickart, "Electronic and Ionic Devices (Translation)", Trudy, vol. 41, 1940, pp. 236–296.
Butaeva et al., "Investigations in Experimental and Theoretical Physics", 1959, pp. 62–70, Studies in Experimental and Theoretical Physics.
Levgyel, "Evolution of Masers and Lasers", Amer. Jour. of Physics, vol. 34, No. 10, 10/66, pp. 903–913.

Primary Examiner—Nelson Moskowitz
Attorney, Agent, or Firm—Lerner, David, Littenberg & Samuel

[57] ABSTRACT

Optically pumped laser amplifiers are disclosed. One type of such amplifier utilizes an excitable medium, the atoms, ions or molecules of said medium having well defined energy states including a lowest state, a lower state above said lowest state, and a higher state above said lower state, and a bright pumping light source composed of a radiative substance different from such medium which radiative substance emits energy in a spectral range which can be absorbed by such medium, and wherein the major portion of the energy absorbed by such medium causes transitions of the atoms, ions, or molecules thereof to populate the higher state. Another type of such amplifier utilizes a medium of atoms, ions, or molecules, some of which have broad bands of energy levels corresponding to a broad band of absorption transitions and energy levels corresponding to at least one fluorescent emission transition, the upper energy levels of said broad bands being above the upper level of said fluorescent emission transition, and wherein some of the upper energy levels above the upper level of said fluorescent emission transition are rapidly quenched via non-radiating transitions to the upper level of said fluorescent emission transition. In a preferred embodiment of the latter amplifier, the lower energy level corresponding to the fluorescent emission transition is relaxed by non-radiating transitions.

12 Claims, 7 Drawing Figures

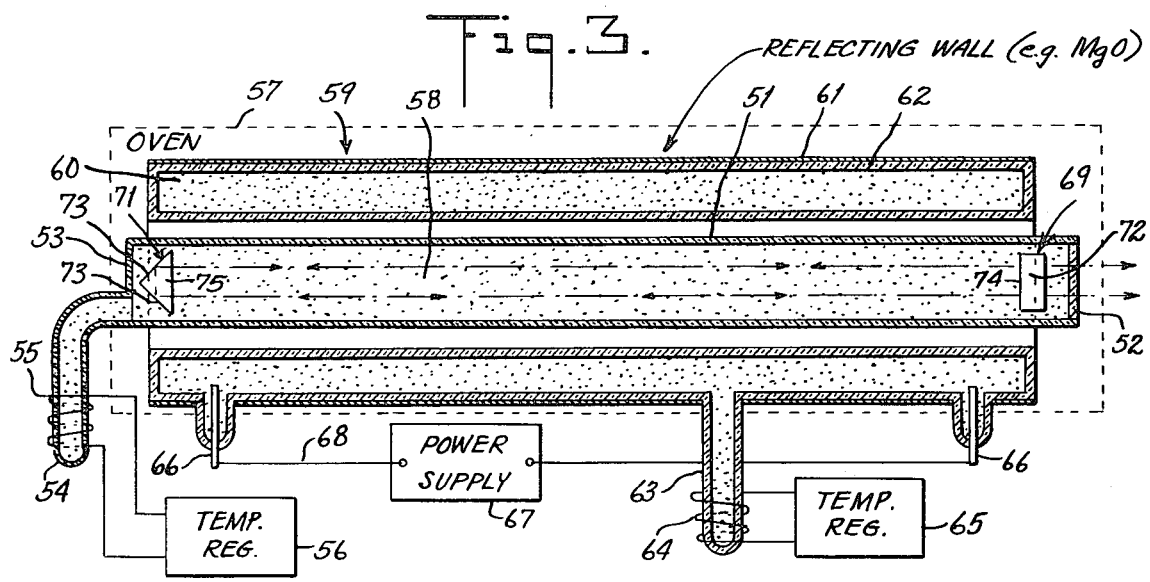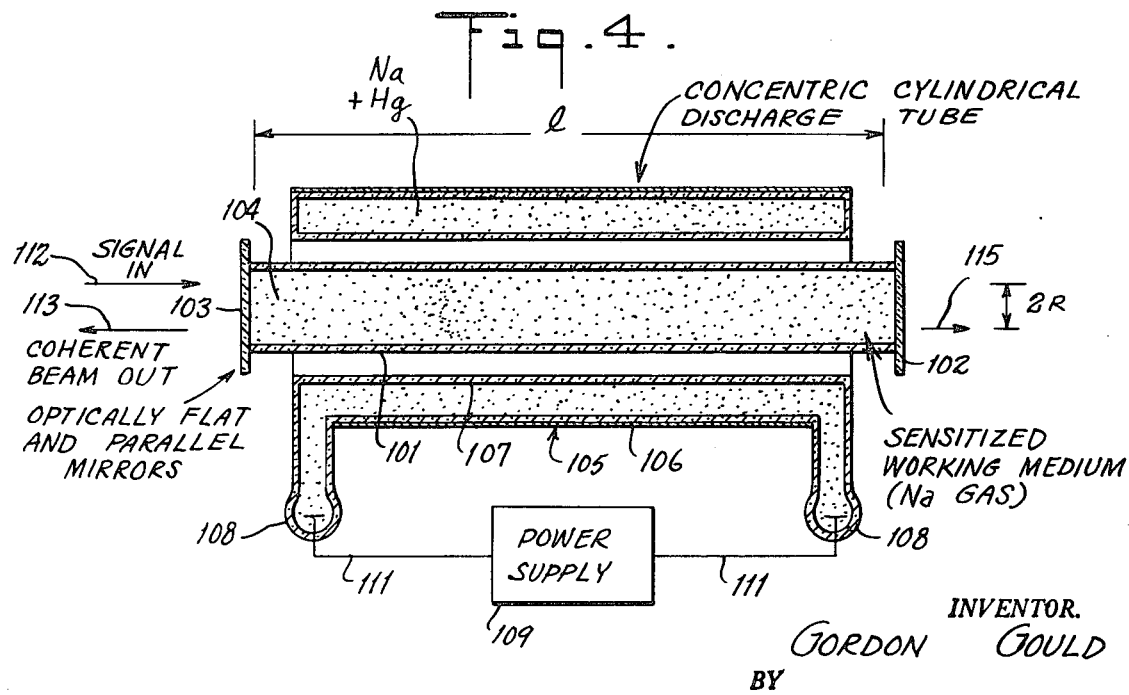

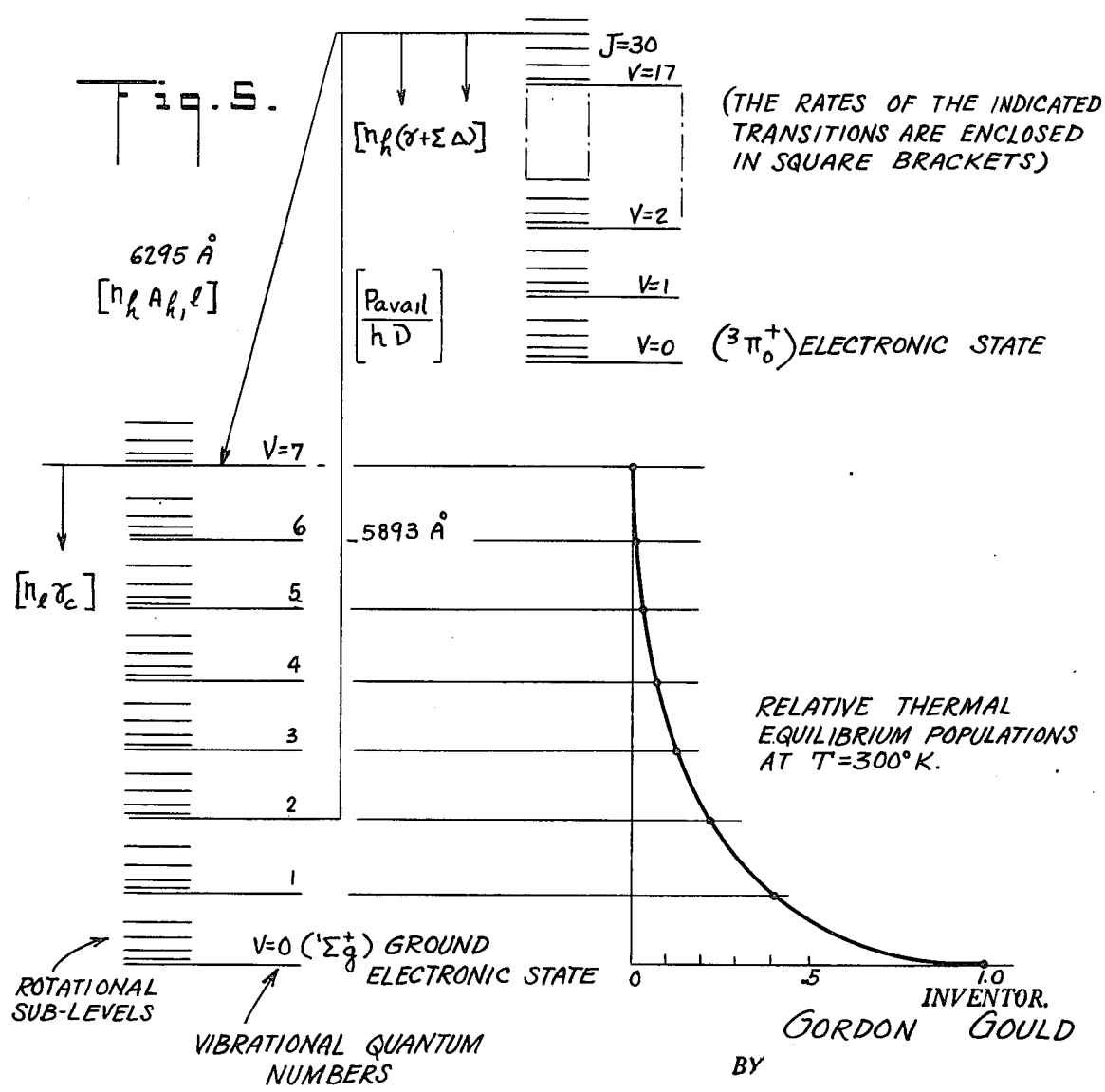

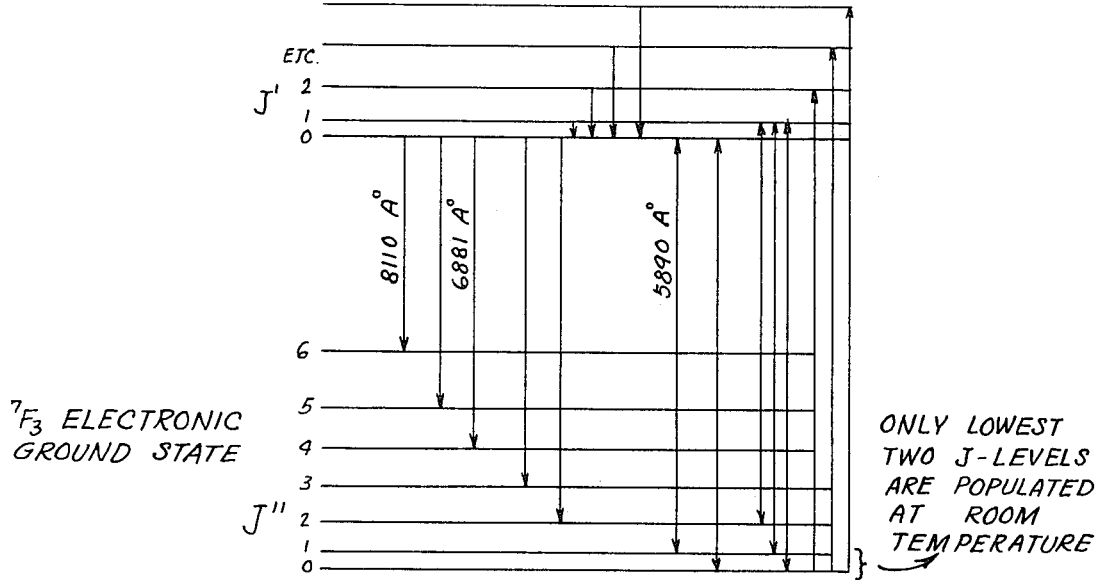

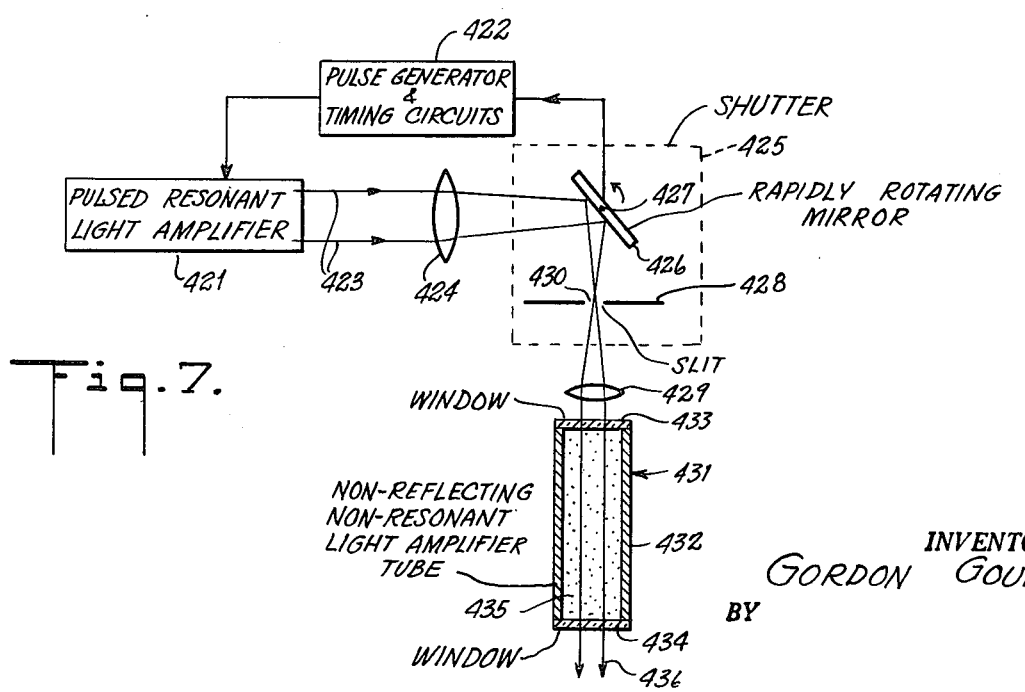

OPTICALLY PUMPED LASER AMPLIFIERS

This application is a continuation of both of my applications, Ser. No. 644,035 filed on Mar. 6, 1967 and Ser. No. 804,540 filed on Apr. 6, 1959, which were co-pending herewith and both are now abandoned. My continuation application Ser. No. 644,035 was co-pending with and (1) a divisional application of my application Ser. No. 804,540 filed on Apr. 6, 1959, now abandoned, and (2) a continuation-in-part of my application Ser. No. 804,539 filed Apr. 6, 1959, now abandoned.

The present invention relates to amplifiers, and particularly to optically pumped light amplifiers.

A short explanation of the physical principles involved will be helpful in explaining the nature of the invention.

It is known that atoms, ions or molecules (hereinafter called molecules) ordinarily exist in so-called "stationary" states possessing a more or less well defined energy. While in such a state a molecule does not exhibit an oscillating electric or magnetic moment. However, since a molecule is made up of charged particles, it will be perturbed by any oscillating electric or magnetic field in which it may lie. When so perturbed, a molecule originally known to be definitely in stationary state "a" will possess a certain probability of being found in state "b" with different energy. When in such a "mixed" state, the molecule may exhibit an oscillating electric or magnetic moment (i.e., it may appear as a system of oscillating charges, or charges in changing orbits). A molecule will undergo a transition from state "a" to state "b" (i.e., have a large probability of being in state "b") if the induced electric or magnetic moment oscillates with almost the same frequency as the applied electric or magnetic field, and if the polarizations and phases of the oscillations correspond. The frequency of the oscillating moment is determined by the Einstein relationship:

$$\Delta E = h\nu_0$$

where
$\nu_0 \equiv$ the oscillation frequency
$h \equiv$ Planok's constant
$\Delta E \equiv$ the energy difference between the two molecular states.

The same equation $E = h\nu$ gives the energy of the photons associated with the electro-magnetic field. The photon density is proportional to the energy density of the field. During a transition, a photon or "quantum" electro-magnetic energy is emitted to or absorbed from the field, depending on whether the molecule is changing from a higher to lower energy state or vice-versa.

Even when there is no radiation energy density of the right frequency directly observable at the molecule, spontaneous transitions occur from higher to lower states with the emission of photons. These transitions are actually induced by random fluctuations in the electro-magnetic field of so-called "empty" space.

The photons emitted during an induced transition have the same phase and polarization as the inducing wave — i.e., they are "coherent" with it. A single atom may radiate a photon in any direction. However many atoms distributed over a finite volume and radiating coherently cooperate to generate a wave having the same propagation vector as the inducing wave, within the limits of a diffraction pattern. That is, they amplify the inducing wave. The radiation from induced emission has a spectral distribution similar to that of the inducing radiation and may be in a very "sharp" line.

Spontaneously emitted photons, because of the random nature of the zero-point fluctuations, have no definite phase or polarization. Because the zero-point fluctuations contain all frequencies, spontaneously emitted radiation has a finite bandwidth, characterized, at the least, by a Lorentzian line shape.

In thermal equilibrium, the populations of two states are related by the Boltzmann distribution factor:

$$\frac{N_{high}}{N_{low}} = e^{-\left[\frac{E_{high} - E_{low}}{KT}\right]}$$

Thus, in equilibrium the population of a higher energy state is less than that of a lower energy state. In particular, the population of a state separated from the lowest by an optical frequency is practically nil at ordinary temperatures. Induced transitions under these conditions necessarily absorb photons from the radiation field.

The foregoing principles can be utilized to devise apparatus for microwave amplification by stimulated emission of radiation which has been termed a MASER. If by some means the population of a higher energy state is made larger than that of a lower energy state, induced transitions must necessarily result in the emission of photons to the radiation field. Thus a molecule may emit spontaneously a photon which in turn may induce coherent emissions in neighboring molecules, adding to the total radiation energy. If the transition is at a microwave frequency, the system may be enclosed in a cavity resonant at the same frequency and the escape of the photons prevented. If the power loss from the cavity is less than the power emitted from the molecules, the system will oscillate with a frequency which fluctuates much less than the (Lorentz) bandwidth of the transition. The condition for MASER oscillation in a gas is that the excess population density $$N_h - N_o > \frac{h}{8\pi^2 p^2 \tau Q}$$

if the gas fills the cavity.
$T = T_1 = T_2$ is the relaxation time or state lifetime.
$Q \equiv$ the "quality factor" of the cavity.
$p$ is the oscillating electric or magnetic moment characterizing the transition.

If the condition for oscillation is not quite met but external power is coupled into the cavity, the "sensitized" or "pumped" molecules will add to or amplify the signal. Because power is lost through the output coupling, the condition for infinite gain, at optimum output, is $$N_h - N_o \geq \frac{h}{4\pi^2 p^2 \tau Q_{unloaded}}$$

This amplification adds very little random "noise" to the amplified signal. The minimum noise is determined by thermal fluctuations in the radiation field or by random spontaneous emission, whichever is larger.

Several methods have been proposed for maintaining an excess population in the higher of two molecular energy states of a gas filling a resonant MASER cavity.

One form of MASER which has been proposed achieves "optical pumping" by unpolarized light.

The discussion of this form of "optical pumping" will be given in terms of rubidium (atoms) but would be similar for other cases. Light, characteristic of various spontaneous transitions in Rb, is generated in a discharge lamp and passed through a filter. The filter removes all frequencies except that component line which induces transitions from the F = 1 hyperfine level of the ground electronic level to some particular higher electronic level. Spontaneous decays back to both hyperfine ground levels will result in a net pumping of Rb atoms from F = 1 to F = 2.

To maintain an excess population in F = 2 over F = 1, the optical pumping rate need only exceed the collision relaxation rate which may be made as small as 10/sec. Of course this minimum pumping rate would give a correspondingly small power output from the MASER.

In the light amplifier, on the other hand, the negligible thermal population of higher electronic states and the high rate of spontaneous emission from these states, make necessary a much higher pumping rate. In general, these effects preclude light amplifier operation between a higher state and a ground state. Usually, a transition between two higher electronic states must be utilized.

Like the MASER, the light amplifier will operate on the principle of induced transitions from a higher energy state to a lower energy state with smaller population. However, the techniques usable and possible are appropriate to the optical region of the electro-magnetic spectrum. This frequency range is defined for the present purpose by the limit of transparency of materials in the infrared and ultraviolet to be approximately:

$$\begin{cases} 10^{-2} \text{cm} > \lambda > 10^{-5} \text{cm} \\ 3 \times 10^{12} \text{cycles/sec} < \nu < 3 \times 10^{15} \\ \text{cycles/sec in practice.} \end{cases}$$

Another limitation which becomes serious in the far ultraviolet is the amount of power spontaneously emitted by the active atoms. This emitted power increases as $\nu^4$, and must be equaled or exceeded by the input power in order to have light amplification. At $\lambda$ = 1000 A an input power of the order of 1 kilowatt is required. Below this wavelength the required input power is too large to dissipate.

Likewise, the useful properties of the light amplifier are qualitatively different from the MASER and derive from the vastly shorter wavelength and higher frequency of the radiation involved.

The previous explanation has been given in terms of amplifiers and amplification, but it should be understood that if sufficient gain can be achieved, the light amplifying apparatus can be rendered self-oscillating. Thus a controlled light oscillator may be provided as well as an amplifier. The systems utilizing the apparatus as an oscillator will also be useful.

Another form of light amplifier according to the present invention, which will be described as a resonant form, has somewhat different characteristics and is useful for different and quite varied applications. It is a characteristic of a resonant light amplifier constructed according to the present invention that its output is in the form of a beam which is very nearly a plane wave if the input is a plane wave. That is, the divergence of the beam may be very small so the energy of the beam is substantially contained within a very small solid angle of the order of $10^{-8}$ steradians or less.

Apparatus according to the present invention provides the capability of amplifying light coherently, at least with respect to frequency and phase and in some cases also with respect to direction of propagation, and axis of polarization. Insofar as is known no apparatus with this capability has heretofore been produced.

A coherent infrared light molecular amplifier and generator has been proposed in U.S. Pat. No. 2,851,652 to Robert H. Dicke. This apparatus and methods proposed by Dicke differ in many respects from those of the present invention. In the Dicke device ammonia molecules are provided in a bounded volume wherein the higher of two molecular energy states is more highly populated than the lower; this is accomplished by physically separating, by electric fields, the molecules in the lower state from a beam of molecules before the beam is permitted to enter the bounded volume. Such activated molecules are capable of amplifying an electromagnetic wave within a particular frequency range.

The present invention, on the other hand, causes the atoms, ions or molecules of the working medium to be activated to produce the desired population excess in the higher energy level without actual physical separation. Furthermore, the desired population excess is produced within the bounded volume in which emission takes place in the present invention; whereas, in the Dicke apparatus the physical separation to produce the desired population distribution is accomplished outside the cavity after which the working medium is physically transported into the bounded volume in which stimulated emission takes place, A simple very effective apparatus results from the different method and apparatus for activation utilized in the present invention.

In addition to the above objects and advantages of the present invention, it is an object of the present invention to provide a light amplifier wherein light is amplified by raising atoms, ions or molecules to a particular energy level and stimulating them by exposure to light having a frequency corresponding to the energy difference between that level and a lower energy state of the atoms, ions and molecules thus stimulating the atoms, ions or molecules to decay to the lower energy state with the emission of light energy coherent with the stimulating light, thereby amplifying it.

It is another object of the present invention to provide a light amplifier wherein a confined space is provided with reflecting walls causing emitted light to re-traverse said space repeatedly causing additional stimulation of atoms, ions or molecules within said space.

It is a further object of the present invention to provide a light amplifier wherein the atoms, ions or molecules are raised by exposure to light from a gaseous discharge lamp to a particular desired energy level (from which stimulated decay is to be produced).

It is a still further object of the present invention to provide a light amplifier of the type described immediately above in which the gaseous discharge lamp is filled with an element different from that of the atoms, ions or molecules to be excited and which has an atomic resonance which by chance coincides with a spectrum line of the atoms, ions or molecules to be excited.

Other objects and advantages will be apparent from a consideration of the following description in conjunction with the appended drawings, in which:

FIG. 3 is a partially schematic illustration of a resonant light amplifier excited by incoherent light radiation and utilizing triangular prisms as reflecting surfaces;

FIG. 4 is a partially schematic illustration in cross-section of a resonant light amplifier excited by incoherent light radiation and utilizing optically flat parallel mirrors for its reflecting surfaces;

FIG. 5 is a diagram of the energy levels of the iodine molecule useful in explaining a form of the invention utilizing coincidence of spectral lines in energizing a working medium in a light amplifier;

FIG. 6 is a diagram of the energy levels of the Europium ion, $Eu^{+++}$, useful in describing a form of the invention utilizing a non-gaseous working medium; and FIG. 7 is a partially schematic diagram of a system for generating short light pulses comprising a pulsed resonant light amplifier in which a transient light pulse may be generated, for example, a rapid shutter for "trimming" the ends of the transient wave-train, and a nonresonant light amplifying tube which further shortens and "peaks" the pulse.

NONRESONANT LIGHT AMPLIFIER

Figure 1:
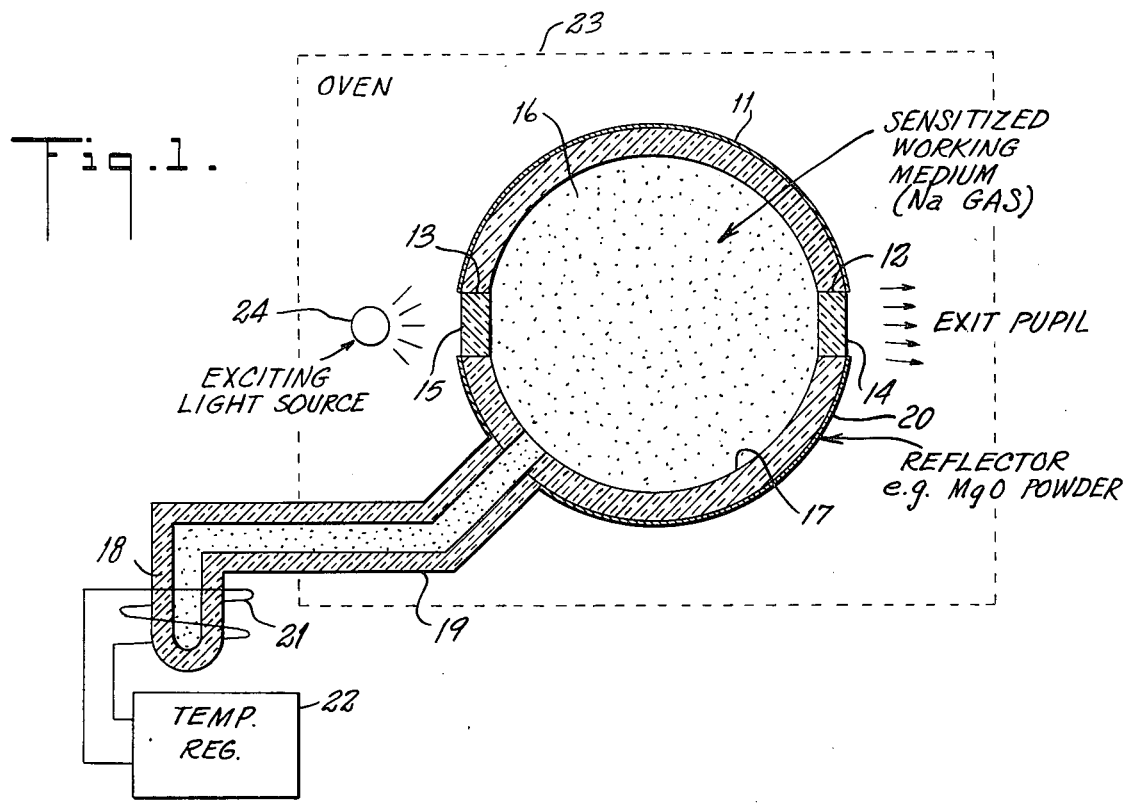
FIG. 1 is a partially schematic illustration in cross-section of a nonresonant light amplifier designed to be excited by an external source of light radiation.

Referring to FIG. 1, there is shown at 11 a spherical cavity 11 forming a principal part of a nonresonant light amplifier. Although a spherical cavity has an optimum volume to surface ratio, the cavity need not be of this shape but could be cylindrical, rectilinear, or of other shape if desired.

The cavity 11 is provided with apertures 12 and 13 for the output and the exciting light input respectively for the cavity. Suitable windows 14 and 15 are provided to cover the apertures 12 and 13 and should be made of a material such as glass or the like, having a high transmission coefficient for the frequency of light involved.

The interior 16 of the cavity 11 is filled with a sensitized working medium in this form of the invention, the nature and function of which will be hereinafter explained in more detail.

The wall 17 of the cavity 11 is rendered reflective as by a reflective coating 20. This surface may either be a specular reflector such as polished metal, or a diffuse reflector. For light in the visible region the highest reflectivity is achieved with a diffuse reflector such as magnesium oxide powder, and such a reflective surface would generally be preferred for the reflecting coating 20.

A gaseous atmosphere for the cavity interior 16 is supplied from a reservoir 18 connected to the cavity by a conduit 19.

A heating coil 21 controlled by a temperature regulator 22 may be utilized to maintain the vapor in the interior of the cavity at the desired pressure. A temperature control oven 23 is provided surrounding the cavity 11 to maintain the cavity at a temperature higher than that of the reservoir 18 thus preventing condensation in the cavity 11 and assuring control of pressure by means of a temperature regulator 22 regardless of changes in ambient temperature of the cavity.

Light is directed from an exciting light source 24 through the window 15 to the interior of the cavity 11. In a typical case, the light source 24 will comprise a gas discharge lamp having a gaseous atmosphere similar in composition to that of the atmosphere in the interior 16 of the cavity 11.

Although solid or liquid fluorescent material may be advantageous in certain applications rather than a gaseous medium within the cavity 11 in FIG. 1, transition processes in gases are more completely understood and accordingly the explanation will be primarily directed to this more readily understood form.

OPERATION OF NONRESONANT LIGHT AMPLIFIER

The operation of the light amplifier of FIG. 1 will first be explained with reference to a relatively simple form of excitation, that is, excitation by resonance radiation. It should be understood that other forms of excitation which will later be explained may in many cases be preferable to the simpler type of excitation by resonance radiation.

A desirable medium for this form of excitation is sodium vapor and for the purpose of this explanation, it will be assumed that the interior 16 of the cavity is filled with sodium vapor and that the exciting light source 24 is a sodium vapor lamp.

Figure 2:
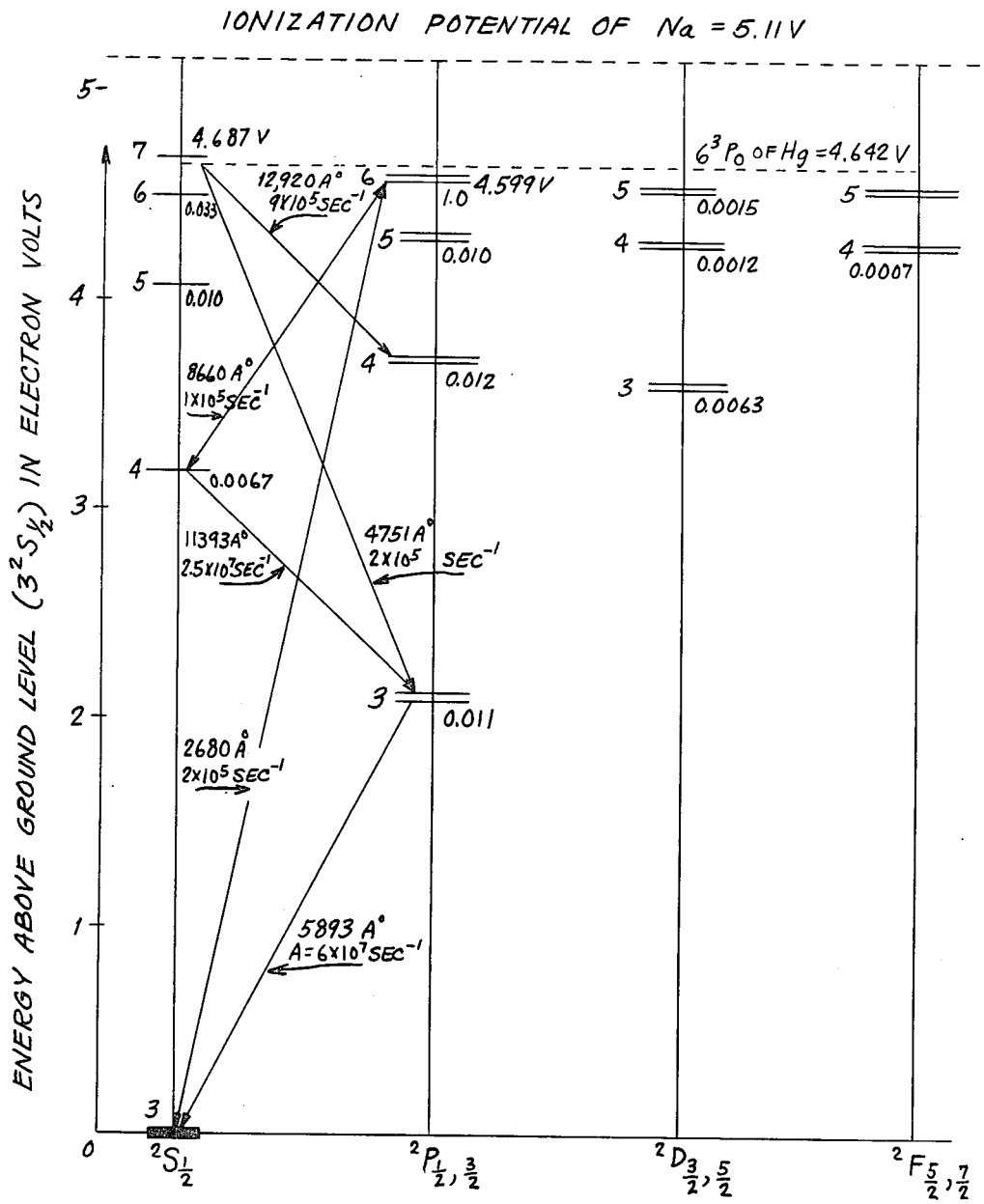
FIG. 2 is a Crotrian diagram of energy levels of sodium presented to aid in the explanation of light amplifying apparatus according to the present invention.

FIG. 2 is a diagram of some of the higher electronic levels of sodium. The hyperfine structures of these electronic levels are not shown.

The free-space wavelengths (in Angstroms) of the electro-magnetic radiation emitted during transitions between certain pairs of levels are given on the diagram of FIG. 2. The measured or estimated spontaneous emission rates for these transitions are also indicated. Electric dipole radiation selection rules permit transitions only between levels in adjacent columns of the diagram. Thus no transitions occur between levels with the same latter designation (same orbital angular momentum). Atoms in the ground level ($3^2S_{1/2}$) can be excited by resonance radiation from a sodium lamp only to the various P-levels. However, all states may be excited by collisions with energetic electrons in a discharge or by collisions with other excited atoms (collisions of the second kind).

It is desired to achieve a higher population in some higher level than in a lower level, to which transitions may be induced by the presence of light energy of suitable frequency. If it is assumed that only the $6^2P$ levels are excited directly from the ground level, light exciting other levels could be removed by an appropriate optical filter. Then by spontaneous emission various lower levels will become populated to some extent. The populations in dynamic equilibrium may be calculated from the spontaneous decay rates.

If the $6^2P$ levels are assumed to have a unit population, the computed populations of the other lower levels are shown in the diagram. It may be noted that the population of the $4^2S_{1/2}$ level is only 0.0067 of the $6^2P$ levels population and hence transitions generating the 8660 A infrared line may be expected in a suitable enclosure.

From the diagram of FIG. 2 and the foregoing explanation, it will be seen that when the medium in the cavity 11 is excited by the light from the light source 24, a condition is produced where the population of a higher energy level ($6^2P$) is much higher than the population of a lower energy level ($4^2S_{1/2}$) so that the presence of light of the frequency represented by the difference between these two energy levels (wavelength 8660 Angstroms) will stimulate decay from the higher energy level to the lower energy level with the emission of more light of this same frequency.

Accordingly, when the pumping rate due to excitation from the source 24 is sufficiently great to maintain a large population difference between these two levels in favor of the higher level, and when losses in the cavity are reduced to a sufficiently low level as by maximizing the reflectivity of the surface 20, conditions for sustained oscillation will be met and the apparatus of FIG. 2 will operate as a nonresonant light oscillator.

Obviously, if the conditions for oscillations are approached but are not met, light of the appropriate frequency (8660 Angstroms) introduced into the cavity will be amplified by the stimulated emission of radiations and the output of the cavity at that frequency will be greater than the input thus providing amplfication, but self-sustained oscillation will not occur.

The nonresonant light amplifier of FIG. 1 is schematically shown with a relatively small window for the introduction of light excitation; in practice, it will generally be desirable to utilize a substantial portion of the surface of the cavity as a window for light excitation. It will be recognized that increasing window area cuts down on the available surface for reflection. The effective reflection coefficient may be kept relatively high by arranging the reflective portions of the cavity on opposite portions of the surface of the amplifier enclosure.

If the window area desired for light excitation is a substantial portion of the total area of the cavity, it may be preferred to make the amplifier in another form, such as cylindrical, for example. This form may be particularly desirable as the curved peripheral surface of the cylinder may be made transparent for the introduction of light excitation while the ends of the cylinder may be rendered diffusely reflective. With this arrangement a large amount of light power may conveniently be transmitted into the cavity. Although there may be some reduction of average effective reflection coefficient, this is offset by other considerations.

If the cylindrical nonresonant amplifier described above is made in elongated form, only light within a narrow angular range of direction of propagation will be amplified and thus the noise due to spontaneous emission will be reduced, yielding a narrower output bandwidth. The output of an elongated cylindrical nonresonant amplifier may largely be restricted to an angle on the order of approximately 6°; this is much more convenient and may be directed more efficiently than the diffuse output as from a spherical amplifier or oscillator.

Tendency toward resonance in the elongated cylindrical nonresonant light amplifier will be avoided by the fact that light paths of many different lengths will exist between the reflectors; if desired, the reflectors may be shaped to increase the diversity of optical path lengths between reflectors.

Various elements other than sodium may be utilized in the construction of such a nonresonant amplifier, particularly those elements in group 1 of group 3. The characteristics of sodium, however, are generally more favorable than those of other elements.

A slightly more complex mode of operation has definite advantages over the relatively simple resonance radiation excitation described above. This mode of operation utilizes enhancement of intensity by collisions of the second kind to enhance the intensity of a particular spectral line from the lamp.

Considerable study has been made of the phenomenon of "sensitized fluorescence". Atoms of one kind, excited to a particular electronic level, may, on collision with atoms of a second kind, transfer their excitation energy. It has been shown experimentally and theoretically that the transfer process is most probable if two conditions are fulfilled:

a. The smaller the energy difference between the levels of interest in the two kinds of atoms, the greater is the collision cross-section for the exchange.

b. The total electronic angular momentum of the two atoms remains the same before and after the collision (Wigner partial selection rule).

In connection with rule (a), the energy difference must be converted to or from kinetic energy of the atoms. If the energy difference is less than "thermal energy" ($<XT\approx0.03$ ev) and if rule (b) is obeyed, the cross-section may be more than 100 times the "kinetic theory" cross-section. In particular, collisions of the second kind have been observed between metastable Hg ($6^3F_0$) atoms and sodium atoms in a mixed gas. It will be observed from the diagram of FIG. 2 that the Hg ($6^3P_0$) level falls between the Na(7S) and Na (6P) levels and is <0.045 ev from either. It has been observed that the visible Na (7S → 3P) 4751 A line became as intense as the Na (3P → 3S) 5893 A line under certain conditions, showing that the bulk of the energy was transferred to the Na (7S) level. The intensity enhancement will be about 20 times. It may be expected that transitions from the $6P_{1/2}$ level will be similarly enhanced.

The proper mixture of Hg in Na amalgam to obtain the necessary pressure of both Na ($\sim 10^{-4}$ mm Hg) and Hg ($\sim 1.0$ mm Hg) at operating temperature can be obtained from published data or approximately from Raoult's law.

From the foregoing explanation, it will be seen that by utilization of collisions of the second kind with a different kind of atom, the efficiency of the operation by which a greater population of a higher energy level is produced by optical-pumping may be substantially increased with a resulting increase in efficiency of operation of the light amplifying device.

The usefulness of the nonresonant light amplifier is somewhat limited by the large amount of noise present in the output signal. Random fluctuations in frequency or phase of the signal are generated by spontaneous transitions. In particular the usefulness of the nonresonant apparatus as an amplifier (as contrasted with an oscillator) is limited by this background of random spontaneous emission giving rise to a noise bandwidth of approximately 1000 megacycles (the Doppler width of the spectral line). The approximate equivalent noise temperature of the nonresonant light amplifier at the center of the visible spectrum is 30,000° K.

Furthermore, the nonresonant light amplifier, in spite of short term fluctuations in frequency, has a long term average frequency which is very constant. Thus by averaging the frequency over a finite period of time a light frequency standard may be obtained having a degree of accuracy comparable with that of any known frequency standard. Such a standard is useful not only in the measurement of time but also in the measurement of distance by interferometric techniques.

RESONANT LIGHT AMPLIFIER

The previously described light amplifier of FIG. 1 is termed a nonresonant light amplifier because the frequency of the light output, while relatively constant, is not to any substantial extent dependent upon the dimensions of the cavity within which the oscillation is generated.

An alternative form of the light amplifier will now be described in which the "resonant" frequency of the device is highly dependent upon the dimensions of the cavity. The resonant light amplifier also differs in other important respects, but the resonant characteristic of the device is utilized as a convenient way of distinguishing it from the previously described nonresonant light amplifier.

In FIG. 3 there is shown an elongated cavity 51 enclosed at the ends by end portions 52 and 53. As was the case with the nonresonant apparatus, a reservoir 54 is provided for supplying a gaseous atmosphere to the interior of the cavity. A heater 55 illustrated as a heating coil is controlled by a temperature regulator 56 to insure control of the pressure within the cavity 51.

As in the case of the light amplifier of FIG. 1 and, an oven 57 may be provided to enclose a portion of the apparatus to maintain it at a temperature higher than that of the reservoir 54 thus preventing condensation within the cavity 51 and allowing closer control of the pressure of a gaseous atmosphere.

From the foregoing explanation, it will be seen that the interior 58 of the cavity 51 is, in this form of the invention, supplied with a gaseous medium, the pressure of which can be controlled by means of the temperature regulator 56. The gaseous medium within the cavity 51 in FIG. 3 will be considered to be sodium, although as previously explained, other mediums may be used.

Excitation for the medium within the cavity 51 is provided by a cylindrical gas discharge lamp 59 surrounding the cavity 51. The gas discharge lamp 59 is preferably a sodium vapor lamp filled with a suitable gas or a combination of gases such as sodium and argon.

The outer wall 61 of the lamp 59 may be provided with a reflecting surface such as magnesium oxide to conserve light, whereas the inner wall 62 of the lamp 59 is preferably highly transparent to the desired spectral components of the light produced by the lamp.

The wall of the cavity 51 is also preferably highly transparent to this light. It is obvious that if desired a single wall may be provided between the interior 60 of the lamp 59 and the interior 58 of the cavity 51, thus making these two portions of the device as one integral element. The wall 62 may be formed of a material acting as an optical filter, if desired, thus discriminating against certain components of the light from lamp 59 which are not desired. The lamp 59 may also be provided with a reservoir 63, a heater 64 and a temperature regulator 65 in a manner similar to that provided for the cavity 51 so that the pressure within the discharge lamp may be independently controlled by means of the temperature regulator 65. It will be noted that the oven 57 also maintains the interior of the discharge lamp 59 at a higher temperature than that of the reservoir 63.

Electrodes 66 are provided in the lamp 59 and are supplied by power from a supply 67 through leads 68. The nature of the electrical excitation of the lamp 59 may be selected for the best results in a particular application and may be, for example, direct current, alternating current, or high frequency radio frequency excitation, etc.

It has previously been noted that it is desirable to provide means to confine and retain the light energy within the cavity in order that a number of emissions of light energy will be stimulated and the intensity of the light will be built up providing amplfication in a manner somewhat analgous to that which occurs in the electron multiplier tube through avalanche effect.

The apparatus of FIG. 3 differs from the previously described nonresonant light amplifiers of FIG. 1 in that the reflectors are specular reflectors rather than diffuse reflectors as used in the nonresonant cavity.

The reflectors in the cavity 51 comprise prisms 69 and 71. Mirrors may be used as reflectors in the cavity 51 but in many instances prisms are preferable due to the requirement for an extraordinary high degree of planarity and parallelism when plane mirrors are used and which requirement is significantly reduced by the use of prisms.

Thus the use of prisms is a feature of the invention of great practical importance. Prisms 69 and 71 are illustrated as triangular right-angled prisms. That is, the faces 73 of prism 71 are at right angles to each other as are the faces 72 of prism 69 (one of the faces 72 is not visible due to the orientation of a prism 69). Such 90° prisms can be ground with a high degree of accuracy. Assuming that the prisms are so ground, it is known that light rays entering the faces 75 or 74 of the prisms 71 and 69, respectively, are returned almost exactly in the direction from which they originated for a substantial range of angles of incidence with the front face (75 of the prism 71, for example). Furthermore, the effective pathlength for rays entering the face 75 is substantially the same over the surface of the face even though the angle at which the rays strike the face 75 is not exactly 90°.

The prisms 69 and 71 are preferably oriented so that their rear (roof) edges joining the diagonal faces are at 90°. That is, in FIG. 3 the edges joining the reflecting faces of the prism 69 are vertical while the edges joining the reflecting faces of prism 71 are horizontal.

Accordingly, with face 75 nearly perpendicular to the direction of impinging light rays, the prism 71 may be rotated several degrees about a horizontal axis extending into the paper without causing an appreciable change in the direction of reflection. The prism 69 can be rotated several degrees about a vertical axis without causing an appreciable change in the direction of the reflected rays. As a result, the placement of the two prisms 69 and 71 is not critical with respect to rotation about either of the orthogonal axes parallel to the rear edges of the prisms. As a result, the prisms 69 and 71 once ground to the tolerance required as regards the planarity and angular relationship of the various faces can be placed within the cavity 51 without any highly critical requirements of parallelism as regards the faces 74 and 75.

There are several alternative ways to reduce the criticality of the angular positioning of the reflectors. For example, one may replace the prism 71 with a corner reflector with three mutually perpendicular planar surfaces (which may also be a prism) and replace the prism 69 with a plane mirror. The mirror may be a "low loss" multilayer reflector which selectively reflects only light of the desired wavelength.

The advantage of utilizing prisms rather than mirrors may be appreciated by consideration of the general mode of operation of the resonant light amplifier. It is desired that the light rays traverse the distance back and forth between the reflecting beams a considerable number of times. If the optical pathlength over each circuit of the two reflecting means, and in fact, if the path circuit over a plurality of circuits of the reflecting means is not the same for each and every portion of the reflecting surface within the accuracy of a fraction of the wavelength, interference will be produced and a resonant nature of the system will be diminished or destroyed.

It is likely that one limit of the efficiency of the system will be the tolerances to which flat optical surfaces may be produced. It may be impossible to obtain a surface with a closer tolerance of flatness than approximately one-fiftieth of a wavelength as a practical matter. This, of course, will limit the efficiency of resonant light amplifiers utilizing prisms as well as the resonant light amplifier utilizing flat mirrors. In the case of the mirrors, however, it would also be necessary to place and retain the mirrors in respective ends of the cavity (which may be separated in a typical case by 30 centimeters) in parallel relationship with a tolerance of one-fiftieth of a wavelength, approximately. This can likely be achieved although it would necessarily involve a phenomenal degree of precision and expensive techniques that would go with such a precise operation. Furthermore, the completed device would be highly sensitive to disturbances and vibration of all types including physical accelerations, changes in temperature, etc.

The prisms 69 and 71 are preferably provided with non-reflective coating on their front faces 74 and 75, as light reflected from these faces will generally be lost due to being out of phase or slightly misdirected and will not add coherently to the main standing wave in the cavity.

The faces 73 of the prism 71 would normally be substantially 100% reflective. An output from the cavity (or in the case of an amplifier operation, an input as well) may be provided through one or both of the faces 72 of the prism 69. The face 72 may be rendered partially transmissive by placing on or near the face a material which has an index of refraction which does not differ from the index of refraction of the prism sufficiently to provide total internal reflection. By this means, any desired portion of the light impinging on one or both faces 72 may be transmitted to the outside of the cavity. Conversely, if the apparatus is to be used as an amplifier, thus necessitating an input, the same path or a similar path may be used for the input to the light amplifier.

In the case of an amplification operation as contrasted to an oscillator operation, there will generally be a loss of energy involved in transmitting the input signal into the cavity and transmitting the output signal out of the cavity. Obviously any normal type of transmission path for light energy into the cavity will also provide a path for the same kind of light energy out of the cavity. One may expect a loss on the order of 50% in this operation, but this will not be serious in view of the overall gain produced by the light amplifier. Such a problem need not arise in the case of a light oscillator as no input signal is required due to the fact that oscillations are built up from ever-present random fluctuations as is the case with other types of oscillator devices.

OPERATION OF RESONANT LIGHT AMPLIFIER

As previously explained, the induced emission from atoms is coherent with the inducing radiation. That is, it has the same phase, frequency and polarization. If many atoms over the breadth of the inducing wave are emitting, the emitted radiation will also be a substantially plane wave with the same propagation vector except for small diffraction effects. With this understanding it will be seen that the resonant light amplifier of FIG. 3, although it has only small reflecting surfaces compared with its total cavity internal area, effectively confines the amplifying operation due to the fact that only light energy within a very narrow range of frequency and propagation direction is amplified and this energy has a direction of propagation vector such that it is substantially contained between the two reflecting surfaces.

There will be slight losses of energy off the edge of the reflectors due to slight discrepancies in the angle of propagation of the rays being amplified. This slight energy loss will not be sufficient in a well designed apparatus to prevent proper operation of the device.

Within its frequency and angular limits, determined by the dimensions and loss coefficient on reflection, the resonant light amplifier will amplify plane waves continuously variable in direction and frequency.

If the input wave is plane, the output wave is almost but not exactly plane. The finite size of a wavelength, $\lambda$, allows the wave front to spread as it travels. At great distances from a circular end-plate, the wave front, instead of remaining a circle of constant diameter, exhibits the Fraunhofer diffraction pattern of intensities. In this pattern approximately 98% of the light falls in a central spot of angular radius $$\Delta\theta = 1.220(\lambda/2R)$$

more than half the light falls in a cone of half this angular radius. If the wave is focused on a nearby plane, one observes the same pattern instead of a point. The Rayleigh criterion for angular resolution of two plane waves focused in a telescope is that the waves shall make an angle with each other equal to $\Delta\theta$. That is, the maximum of one falls on the first dark ring of the other pattern. Thus plane waves from different points of a distant object could be amplified coherently by the resonant light amplifier and then focused on a screen or the face of a television camera tube. The resulting image could be scanned or otherwise used.

If a plane wave passes through a circular aperture, then at nearby distances the wave starts to spread and forms the Fresnel diffraction pattern.

Thus as a "plane" wave reflects back and forth inside the tube, light dribbles out of the cylindrical space between the reflectors. The fraction of light lost by this mechanism in travelling a distance $l = L/a$ is very approximately given by $$\phi_{Diff.} = \text{fract. lost} \approx \frac{1}{2R}\sqrt{\frac{L}{2a}}$$

where L/a is the mean distance travelled by a photon before it is lost at a reflector.

If $\phi \rightarrow 1$ then the effective loss on reflection, a, will be appreciably increased. This puts a lower limit on the radius of the reflector. If L = 100 cm
$\lambda = 5 \times 10^{-5}$ cm
a = 0.05
2R = 1 cm then $\phi_{Diff.} \approx 0.3$ which is about as high as desirable.

MIRROR TYPE RESONANT LIGHT AMPLIFIER

FIG. 4 shows an alternative form of resonant light amplifier device comprising a cavity 101 having transparent side walls and enclosed at its ends by flat mirrors 102 and 103.

The interior 104 of the cavity 101 is filled with a sensitized working medium such as sodium vapor. Placed around the cavity 101 is a concentric cylindrical discharge tube 105. The surface 106 may be provided with a reflective coating to conserve light while the inner wall 107 of the discharge tube 105 is transparent to the desired component of the light produced in the discharge tube.

Electrodes 108 are provided in the discharge tube 105 which are supplied with power from a power supply 109 through leads 111.

In the form of apparatus shown in FIG. 4 the medium in the gas discharge tube 105 is a mixture of sodium and mercury. As previously explained, such a mixture provides an enhancement of a desired spectral line by collisions of the second kind. This brings about a considerably increased intensity of the desired spectral line in the lamp and increases the optical pumping power which creates the desired population distribution in the energy levels of the atoms of sodium in the interior 104 in the cavity 101 conducive to stimulated emission of light radiation.

In FIG. 4 the reservoirs, ovens, and auxiliary equipment for maintaining the proper atmosphere in the discharge tube 105 and in the cavity 101 have been omitted for simplicity. Such elements may be provided for the apparatus of FIG. 4 in accordance with other figures of the drawings or any other suitable means for maintaining the appropriate atmosphere may be utilized.

The mirrors 102 and 103 may be metallized or multilayered interference reflectors. The latter are almost lossless (i.e., the transmission plus the reflection equals approximately 100%). Interference reflectors may have a very high reflectance, for a given wavelength, depending on the number of layers. A practical achievement is 98% in the visible for a 7-layer reflector. Flats with a closer tolerance than approximately 1/50 λ are not currently available so if a resonant system is desired and more accurate flats are not available, higher reflectance would not be useful. An additional advantage of interference reflectors is that photons from other than the desired transition would not be reflected (due to frequency selectivity), and hence, undesired stimulated transitions would be prevented.

It is clear from FIG. 4 that a plane wave travelling in a direction other than 90° to the mirror surface will "walk" off the edge and loss energy at a rate faster than the normal wave. The lateral displacement per reflection is $$x = L \sin\theta \approx L\theta$$

The fraction of wave energy which walks off at each reflection is roughly $$\frac{x}{2R} \approx \frac{L\theta}{2R}$$

So the effective loss coefficient on reflection is $$a = a_{abs. + diff.} + \frac{L\theta}{2R}$$

or the rate of energy loss is $$-\frac{1}{E}\frac{dE}{dt} = a = \frac{ac}{L} = \left[\frac{a_{abs.}}{L} + \frac{\theta}{2R}\right]c.$$

As $a$ increases, the gain of the light amplifier will decline proportionately in the range of linear amplification. A practical measure of the limiting angle at which effective amplification obtains might be that angle for which $$a = 2a_{absorption}:$$

$$\frac{\theta_2}{2R} = \frac{a_{abs.}}{L}$$

or $$\theta_2 = \frac{2aR}{L}$$

the maximum one might conceive would be $\theta_2 \sim 0.1$ radian, while for the dimensions immediately above, $$\theta_2 \approx 5 \times 10^{-4} \text{ radian}.$$

The fact that the loss coefficient falls off with increasing angle, $\theta$, determines a most important characteristic of the resonant light oscillator output, a very narrow beam.

It can be calculated that virtually the entire output beam will fall within the Fraunhofer diffraction pattern for $\theta = 0$. It may also be shown that, with $P_{out} = 1$ watt at $\lambda = 1\mu$, the frequency bandwidth of the output beam will be less than 100 cycles/sec. This is residual bandwidth due to the noise discussed below.

As pointed out previously, the random-fluctuation spontaneous emission background in the visible will correspond to transitions induced by thermal radiation at a temperature of 30,000° K. However, this is not so high as it first appears, since a resonant light amplifier may discriminate against all signals outside a narrow optical band and against all directions of propagation outside the central Fraunhofer lobe.

It can be estimated that the minimum equivalent noise input power in a Fraunhofer lobe is given by :

$$P_{min} \approx 1.5 \times 10^{-11} \text{ watts in the visible}.$$

If the bandwidth, $\Delta f$, is limited in a succeeding electronic amplifier, it can be shown that the following expression for this noise holds $$P_n = h\nu\left[\frac{\pi}{2}\Delta\nu\Delta f\right]^{\frac{1}{2}}$$

Thus the minimum noise depends on the square root of the bandwidth but not on the area of the reflectors 102, 103 at the tube ends.

The apparatus of FIG. 4 may be used as an amplifier as distinguished from a self-sustained oscillator by limiting the "gain", that is, by limiting the amount of light power introduced from the discharge tube 105 so that a self-sustained oscillation is not produced. A signal may, therefore, be introduced through the mirror 103 as indicated by the arrow 112 as the mirrors 103 and 102 are partially transmitting.

The light ray indicated at 112 will cause stimulated emission of light energy within the cavity 101 which is coherent with the input signal with respect to phase, frequency and direction of propagation. The amplification within the cavity is rather selective with respect to direction of propagation and frequency so that only a relatively small range exists with respect to these two parameters within which an input wave will be amplified in the device.

The output from the light amplifier will be transmitted through mirrors 103 and 102 as indicated by the arrows 113 and 115. Either or both of these outputs may be utilized, depending upon the particular application or system in which the light amplifier is used.

As in the case of previously discussed light amplifier devices, the device of FIG. 4 may also be utilized as an oscillator simply by increasing the efficiency of the process or otherwise increasing the gain of the amplifier to the point where self-sustained oscillations are produced. In certain applications it may be desirable to utilize the same apparatus as both an oscillator and an amplifier, on a time sharing basis, for example. This may be accomplished, for example, by periodically increasing the light energy produced by the discharge tube 105 to momentarily produce self-sustained oscillations. It should be understood that the optical system can be replaced by other optical systems such as the one illustrated in FIG. 3, and also that the exciting process utilized in FIG. 4 may be replaced by other exciting processes previously described.

It should be noted that the apparatus of FIG. 4 does not differ greatly from the nonresonant cylindrical amplifier previously described, and the resonant apparatus in FIG. 4 could be converted to a nonresonant amplifier by substitution of diffuse reflectors for the mirrors 102 and 103.

EXCITATION BY COINCIDENT SPECTRAL LINES

Previously, the excitation of atoms by resonance radiation was discussed. The emitted spectral lines from a lamp of the same substance necessarily coincide with frequencies absorbed most strongly by the same type atoms in the light amplifier. However, as pointed out in the discussion of sodium excitation, the intensities of lines emitted from the lamp during decay of higher states are quite weak. It was also pointed out that the intensity of certain of these higher resonance lines could be enhanced by collisions of the second kind with metastable atoms. Another way of obtaining strong excitation to higher electronic levels is by accidentally coincident bright emission lines from another atom.

The chance coincidence of two appropriate atomic lines is small. There is room for some 300,000 spectral lines of Doppler width with only slight overlap throughout the visible and near ultraviolet range. There are at most 1,000 useful resonance transitions in convenient atoms and approximately 30 bright atomic lines with which to excite them. Thus, there is about a 10% chance of one good coincidence. At least three moderately close coincidences are known, as shown in Table III.

TABLE III

"COINCIDENT" ATOMIC SPECTRAL LINES

| | |
|---|---|
| $H_g(3^3P \rightarrow 2^3S)$ | $3889A \approx CA(8^3P_{3/2} \leftarrow \rightarrow 8^3S_{1/2})3889A$ |
| Zn | $3303.7A \approx Na(4^2P_{1/2} \leftarrow \rightarrow 8^2S_{1/2})3303A$ |
| A | $8521.4A \approx Ca(8^2P_{3/2} \leftarrow \rightarrow 6^2S_{1/2})8521.2A$ |

However, in none of these cases is the overlap good enough for high excitation efficiency. On the other hand numerous examples of the excitation of molecules by coincident atomic lines have been observed.

Information is scarce on fluorescence of molecules containing more than two atoms. Therefore, only diatomic molecules are considered herein.

Each electronic level in a diatomic molecule is split into approximately 50 vibrational levels and each vibration level into approximately 200 rotational levels. Therefore, we may expect more than 100,000 absorption transitions from populated levels in every molecule on the average. As expected, there is generally at least one coincidence of a bright atomic spectral line with some resonance transition of a given molecule. By the same token the emission from a discharge in a molecular gas is divided into many weak lines. These cannot be excited by an external lamp conveniently.

Materials which transmit u.v. radiation below 2,000A are not available. Therefore, the light amplifier process previously described cannot be used, i.e., excitation to a high electronic level with light amplifier emission to an intermediate level whose population is kept low by rapid spontaneous decay to a ground level. Instead the properties of molecules require and permit another mechanism for keeping the lower level population lower than some higher level population. This mechanism is relaxation of the lower level population by collisions of the second kind.

To exemplify the whole process, the molecule $I_2$ is considered. (See FIG. 5).

The first member of the sodium principle series at 5893A (See FIG. 2) coincides with one of the numerous absorption lines of the iodine molecule. The transition in question is from a rotational sublevel of the $v = 2$ vibrational level of the ground electronic state ($\epsilon'g+$) up to the $J = 30$, $v = 17$ sublevel of the $(3\pi_o+)$ state. The $v = 2$ of ($\epsilon'g+$) levels are well populated in thermal equilibrium at room temperature (see lower right corner of FIG. 8), while $v = 7$ of ($\epsilon'g+$) has less than 1% of the population and $v = 17$ of $(3\pi_o+)$ has none.

A 1 cm thick layer of $I_2$ vapor at a few mm Hg pressure absorbs most of the Na light and raises $I_2$ molecules to the upper level at a rate $$\frac{dn}{dt} = \frac{P_{avail}}{h\nu}.$$

In the absence of light amplifier action, the atoms decay at a rate $$\frac{dn}{dt} = n_h \left[ \gamma_c + \epsilon A(\text{all other states}) \right]$$

where $\epsilon A \equiv$ spontaneous radiative decay rate $\gamma_c \equiv$ rate of removal by relaxation collisions with other $I_2$ molecules (quenching collisions). The cross-section for these collisions is very high since many $I_2$ states are closely spaced in energy. About 5% of the molecules decay to $v = 7$ of ($\epsilon'g+$). Then, by the same method of decay as that first described herein, the dynamic equilibrium rates of population change are $$\frac{dn_h}{dt} = 0 = \frac{P_{avail}}{l} - n_h(\gamma_c + \epsilon A)$$

-continued $$\frac{dn_g}{at} = 0 = n_h A(l - l) - n_{lgc}$$

and $$n_h = \frac{P_{avail}}{h\nu(\gamma_c + \epsilon A)}$$

$$\frac{n_h}{n_g} = \frac{\gamma_c}{A(h - l)}$$

It is to be noted that atoms can be removed from $\nu = 7$ of $(\epsilon' g+)$ only by relaxation collisions to other sublevels of the ground electronic state. Then if the $I_2$ pressure ($\sim 5$ mm Hg) is such that $$\gamma_o \approx \epsilon A_h \approx 20 \times A(h \rightarrow l) \approx 10^7/\text{sec}$$

then $$n_h/n_l \approx 20 > 1,$$

which is necessary for light amplifier action.

The further analysis is quite similar to that for the Na(6P→4S) light amplifier transition. The values involved are not much different and so for a light amplifier tube 1 cm diameter × 100 cm long, the required Na(5893A) intensity from a discharge lamp arranged as a jacket is $I \geq 10^{-3}$ watts/cm² steradian.

As pointed out previously, the intensity in the first line of the Na principle series can easily be made greater than 0.1 watts/cm² steradian, with a factor of 100 to spare.

From the above explanation it will be seen that although a light amplifier may be constructed utilizing light energy from one substance to excite a different substance having a coincident spectral line, the known combinations of monatomic substances bordering on coincidence are not promising.

On the other hand, the coincidences of an atomic line with a resonance transition of a molecule often provides a very high degree of coincidence suitable for use as an excitation process in a light amplifier according to the present invention.

An example of such a coincidence usable as an exciting process is the coincidence of the first member of the sodium principal series at $\lambda = 5893$ Angstroms when very nearly coincides with one of the absorption lines of the iodine molecule.

Construction of a light amplifier device utilizing this type of excitation would be generally similar to that previously described except that the excitation lamp would be a sodium discharge lamp while the working medium within the cavity would be iodine vapor.

LIQUID OR SOLID WORKING SUBSTANCES

The "line" width $\Delta J$, of radiative transitions in ions, atoms or molecules within liquids or solids is generally quite broad because of continuous strong interaction with neighboring atoms. The uninterrupted phase lifetime, $$T_2 = \frac{1}{\pi\Delta\nu-} \sim 2 \times 10^{-13} \text{ sec typically,}$$

while the spontaneous radiative decay time remains long: $T_1 > 10^{-8}$ sec.

The effect of this is to raise the density of excited atoms, etc. required for light amplifier oscillation. This in turn raises the required illumination intensity for an externally excited resonant light amplifier:

$$I_{available} = \frac{AR \ 4hc \ \epsilon A}{l \lambda^3 f(\nu_o) A}$$

The line shape factor, $$f(\nu_o) = \frac{2}{\pi\Delta\nu}$$

for a Lorentz line, and approximately the same for other line shapes. Thus most condensed systems will require a high power input to excite light amplifier action.

An additional difficulty is that excitations in solids or liquids are usually "quenched" by non-radiative processes.

One should accordingly use substances which fluoresce (reradiate) with high quantum efficiency. Some substances which absorb the powerful Na(5893A) line and fluoresce efficiently are the merocyamine dyes, fluorescein, Meldola blue, and Rhodamine "B". More promising are certain substances in which the electrons which take part in the excitation lie in the interior of the atoms or ions concerned and are shielded from environmental perturbations. Such substances, including the porphyrins, ruby, and rare earth ions have much narrower lines.

The use of a polycrystalline solid entails the refraction and reflection of a light wave at the crystal interfaces, preventing the lossless reflection of a wave back and forth between light amplifier reflectors. To avoid this a single crystal ruby could be used.

The difficulties inherent in the use of solid or liquid working mediums may be minimized by use of, for example, the rare earth ion, Eu+++, in liquid solution. The angular momentum sublevels of the first two electronic states are shown in FIG. 6.

The J-sublevels are further split into states and one of the components of the J' = O→J'' = 1 transition overlaps the Na 5893A line. The upper J-levels are rapidly quenched to the lowest two J-levels ($\gamma = 2.5 \times 10^{12}$/sec) but transitions between the upper and lower electronic states occur only by radiative emission at the slow "forbidden" rate, $\gamma \approx 10^3$/sec, in the case of europium sulfate in water.

The ions may be excited by sodium radiation to J'=0 and decay to any of the J'' levels. The two strongest fluorescent transitions at $\lambda = 8110A$ and $6881A$ are suitable for a liquid filled light amplifier.

The J-quenching interaction gives rise to a line width $\Delta\eta \approx 5 \times 10^{11}$ cycles per sec or $\Delta\lambda \approx 6A$. This line width is much sharper than those of other condensed fluorescent substances but broad compared to the spectral lines emitted by atoms in a low pressure discharge ($\Delta\lambda \approx 0.01A$). Therefore, one may artificially increase the power of the Na discharge lamp to get the necessary power without worrying about line distortion.

The necessary intensity of illumination is given by the equation for I available above and is between 0.1 and 1.0 watts/cm stere. A commercial "General Electric" lamp with broadened and reversed sodium lines emits just about this intensity.

Thus it appears that when for particular applications a condensed working substance, such as a liquid is desirable, such a working substance may be utilized in a cavity such as shown in FIG. 3, one example of such a working substance being europium sulphate in water. Excitation would be provided by a sodium discharge lamp similar to commercially available types with a broadened sodium line and emitting an intensity of between 0.1 and 1.0 watts per cm² stere.

It will be appreciated that excitation by resonance radiation, is generally applicable to both the nonresonant and resonant type of light amplifier apparatus, as are the various possible working medium discussed.

RESONANT LIGHT AMPLIFIER FOR GENERATION OF TRANSIENT PULSES

For particular applications it may be desired to operate resonant light amplifier apparatus to generate transient pulses of light energy. Such pulses will generally have the characteristics of the output of a resonant light oscillator, namely narrow frequency bandwidth, near planarity of wave shape, etc. In addition, the transient pulses will have their energy concentrated in a very short time. This time period may be shorter than $10^{-8}$ seconds. The length of the pulse may, of course, be longer and is subject to control, as is the shape of the pulse to some extent, all as will later be explained. The intensity of the pulse will be considerably higher than light intensity obtained with comparable apparatus in steady state operation. The light amplifiers of either the resonant or nonresonant type can, of course, be operated in pulse fashion simply by pulsing the source of exciting energy such as the light excitation or the electrical discharge excitation.

In the previously explained operation of light amplifier devices, the stimulated emission added coherently to the inducing radiation. Except for the refraction effects, a wave-train traveling through an activated light amplifier medium is linearly amplified as long as the density of excited atoms (or ions or molecules) remains substantially unchanged are provided the transition is not "power broadened". By means of operation outside the above limits, different effects are produced (e.g., non-linear amplification), and apparatus utilizing these effects has capabilities beyond those of the previously discussed light amplifier devices.

Apparatus for producing light pulses by the utilization of light amplification in a light amplifier with non-reflecting walls is shown in FIG. 16. A pulsed resonant light amplifier is indicated schematically at 421 and the description thereof.

The pulsed resonant light amplifier 421 is controlled by a pulse generator and timing circuit 422 as previously explained.

The output from the pulsed resonant light amplifier 421 is in the form of light pulses indicated by arrows 423.

These light pulses are directed as desired such as by the lens 424.

In order to take maximum advantage of the amplification effect in a non-reflecting, nonresonant light amplifier according to the present invention, it may be desired to provide the non-reflecting amplifier with a light pulse having as short a rise time as possible. Otherwise, some of the energy stored in the non-reflecting amplifier will be expended in amplification of the low intensity leading portion of the input pulse.

Accordingly, a very high speed shutter arrangement is illustrated in FIG. 7 for obtaining a pulse output having a very short rise time, e.g., a sharply rising intensity with an intensity rise time of less than approximately $10^{-7}$ seconds. Whereas the rise time of the pulsed resonant light amplifier 421 may be on the order of $10^{-8}$ seconds, the shutter 425 may be constructed to have an output having a rise time on the order of $10^{-11}$ seconds.

A shutter 425 comprises a mirror 426 which is very rapidly rotated about an axis indicated at 427. An opaque member 428 is provided having a narrow slit 430. For the position of the mirror 426 shown in FIG. 7, the rays 423 from the pulsed resonant light amplifier 421 are focused on the slit 430 and accordingly pass through the opaque member 428. As the mirror 426 is rotated, the rays from the amplifier 421 are swept across the opaque member 428 and periodically, for a very short time interval, pass through the slit 430.

The width of the slit 430 is preferably that of the width of the Fraunhofer pattern for the light beam at that particular point. The width of the Fraunhofer pattern will be greater as the distance of the opaque member 428 from the mirror 426 is increased. This distance may be set at any convenient value and, if desired, the path of the light rays 423 may be folded by the use of mirrors or the like in order to make the shutter apparatus of manageable size. For example, if the opaque member 428 is placed 10 meters away, the width of the Fraunhofer pattern will be approximately 1/10th of 1 millimeter. The cutting of a slit of this width in the opaque material 428 presents no difficulties.

The mirror 426 is preferably rotated at a very high speed to obtain a pulse having a very short rise time from the shutter 425. If the velocity can be raised to $10^6$ radians per second, a pulse of approximately $10^{-11}$ seconds can be obtained. Known techniques for obtaining high rotational velocity can be utilized in the construction of the rapidly rotating mirror 426. For example, the mirror can comprise a ground "flat" on a small metal cylinder and can be placed in an evacuated enclosure and provided with a substantially frictionless suspension. If desired, magnetic suspension can be utilized. The mirror may be brought to a high rotational velocity by a rotating magnetic field.

It will be understood that the particular shutter arrangement described with reference to FIG. 7 is a preferred form which is capable of attaining a very shortrise time for the output pulse from the shutter. The operation of the nonresonant non-reflecting light amplifier of FIG. 16 is not limited to use with such extremely high speed shutters. Thus, in many instances a slower and relatively simpler shutter such as a Kerr cell may be used to provide a light pulse to the non-reflecting amplifier tube. Furthermore, although a resonant light amplifier provides a desirable type of light source for pulsing the non-linear light amplifier tube, any other light source of appropriate frequency could be utilized if controlled to give appropriate short duration light pulses.

The light on the shutter 425 is directed as by means of a lens 429 into a non-reflecting light amplifier tube 431. The amplifier time 431 comprises a closure 432 having an input window 433 and an output window 434. The interior 435 of the non-reflecting light amplifier tube is filled with a suitable working medium. When utilized in conjunction with a pulsed resonant light amplifier 421, the working medium of the non-reflecting light amplifier tube 431 will generally be the same as that of the pulsed resonant light amplifier 421. In any case, the working medium of the amplifier tube 431 will be such that it is stimulated by the exciting light introduced through the imput window 433.

The output from the non-reflecting light amplifier tube 431 is projected out through the output window 434.

The nonresonant non-reflecting light amplifier apparatus of FIG. 7 operates as follows.

The operation of the pulsed resonant light amplifier 421 and of the shutter 425 have previously been explained. It should be noted that the shutter 425 should be synchronized with the pulse of the pulsed reasonant light amplifier 421 so that the open condition of the shutter 425 occurs as nearly as possible to the maximum intensity of the light pulse from the pulsed resonant light amplifier 421. This function is accomplished by the pulse generator and timing circuits 422.

Light pulses from the shutter 425 pass through the lens 429 where they are collimated. The collimated light pulse passes into the non-reflecting light amplifier tube 431 through the input window 433. In FIG. 7 the excitation means for the non-reflecting light amplifier tube 431 is omitted for simplicity. It will be understood that the working medium in the interior 435 of the amplifier tube 431 will be excited so that there is an excess population of atoms, ions, or molecules in an upper one of two energy levels separated by the frequency of the stimulating light from the pulsed resonant light amplifier 421. The activation energy for the working medium in the light amplifier tube 431 may be provided by light energy introduced through the wall 432, by an internal discharge, or by any other means such as those described hereinbefore.

It will be noted that reflection means are not included within the light amplifier tube 431 as they were in previous light amplifiers explained hereinabove. Accordingly, light photons emitted within the light amplifier tube 431 are not normally reflected to retraverse the interior 435 of the light amplifier tube 431. Usually a photon emitted will thus traverse less than the length of the light amplifier tube before being transmitted to the exterior or absorbed.

Accordingly, there is little opportunity for regenerative action within the light amplifier tube, and a considerable excess population of atoms (or ions or molecules) in the upper two energy levels can be achieved and maintained without spontaneous regenerative oscillation in the light amplifier tube.

When this condition exists in the light amplifier tube 431, it is conditioned to act as an amplifier. Such a non-reflecting nonresonant light amplifier is capable of amplifying light with a frequency bandwidth smaller than the corresponding transition bandwidth of the atoms, ions, or molecules of the working medium, but larger than the resonance response bandwidth of a resonant light amplifier. Also, wave-trains with non-planar wave fronts may be coherently amplified. For example, a diverging spherical wave may be amplified without changing its shape. Such a wave would not be accepted to a resonant light amplified with planar specular reflectors. Of course, a resonant light amplifier may be constructed with reflectors of other than plane shape for amplifying non-planar waves. However, the more flexible non-reflecting nonresonant amplifier is preferred for this purpose.

Although the light amplifier tube 431 would operate as a substantially linear amplifier for low intensity light inputs, it is of more interest to consider the operation of the apparatus for relatively high intensity input pulses. By relatively high intensity, it is meant that the pulse intensity is sufficient to substantially depopulate the higher energy level at a given point before the entire pulse wave-train passes this point in the light amplifier tube. Under such conditions it will be apparent that while the first portion of the input wave-train of light will be amplified to a substantial extent, the trailing portion of the wave-train will not be amplified or will be only slightly amplified.

As the pulse passes through the light amplifier tube 431, this effect will be highly cumulative for as the intensity of the leading portion of the wave-train is built up it will tend to more completely and more rapidly depopulate the upper energy level in the volume through which it passes so that there will be effectively an exponential growth of the intensity of the leading portion of the pulse together with a generally corresponding shortening of the pulse due to the lack of amplification of the trailing portion of the pulse wave-train.

From the foregoing explanation, it will be seen that the non-reflecting light amplifier tube 431 produces a great intensification of the input pulse, together with a considerable shortening of the pulse length. The shortening of the pulse length which can be obtained is limited by the fact that the Fourier transform of a short pulse contains frequency components far removed from the nominal frequency. Thus, as the pulse becomes shorter and shorter, the energy in the pulse will cease to be concentrated at the nominal frequency; as a result the efficiency of the process will deteriorate, thus limiting the shortening of the pulse which can be obtained. Due to this effect and for other reasons, it is unlikely that a pulse length shorter than several hundred cycles of the light frequency can be obtained, no matter how long the non-reflecting amplifier tube is made.

It should be noted that the operation of the nonreflecting light amplifier tube comes somewhat more complex when the transition becomes "power broadshed". These different effects are of consequence when the time required for the wave-train length to pass a given point is less than the phase relaxation time. The various effects produced under this condition will not be discussed in detail. It will suffice to say that under these conditions the pulse passing through the non-linear light amplifier tube will continue to grow shorter and denser. One minor effect is that the peaking action on the input wave form will be somewhat delayed so that the peak will be formed somewhat behind the leading edge of the input pulse wave-train.

Short light pulses such as those obtained from the pulsed resonant light amplifier and even shorter pulses obtainable from the non-reflecting light amplifier tube are useful for various purposes and in various systems, some of which will later be explained in some detail.

The apparatus of FIG. 7 by itself would be useful in the field of high speed photography. The length of pulse obtainable with apparatus as shown in FIG. 7 may be as short as the order of $10^{-12}$ seconds. The ability of a pulse of this short length to "stop" action can be appreciated by the fact that an object traveling at the speed of light would be stopped within one millimeter by such a short pulse of light.

Although the total amount of light energy may be somewhat smaller than conventional photographic light sources, this would not be a serious limitation, and particularly so in the field of microphotography, for example, where only a small area need be illuminated. The fact that the output from the non-linear light amplifier has very nearly plane waves makes it possible to focus the output to as small an area as would be desired for microphotographic purposes.

LIGHT ENERGY MACHINING APPARATUS

In addition to the variations and modifications to applicant's disclosed apparatus which have been suggested, many other variations and modifications will be apparent to those skilled in the art and, accordingly, the scope of applicant's invention is not to be construed to be limited to the particular embodiments shown or suggested but is rather to be limited solely by the appended claims.

What is claimed is:

1. Apparatus for light amplification comprising a bounded volume containing an excitable medium, the atoms, ions or molecules of said medium having well defined energy states including a lowest state, a lower state above said lowest state, and a higher state above said lower state, and a bright pumping light source composed of a radiative substance different from said medium which substance emits energy in a spectral range which can be absorbed by said medium, the major portion of the energy absorbed by said medium causing transitions of the atoms, ions, or molecules thereof to populate the higher state, said bright pumping light source being arranged to direct light into said medium to excite said atoms, ions, or molecules to emit light photons in the bounded volume when stimulated to do so by the presence of stimulating light at a frequency substantially corresponding to the emitted light due to transitions from the higher state to the lower state, said emitted light having substantially the same phase, frequency, polarization and wavefront shape as the stimulating light, thus adding coherently to the amplitude of the stimulting light.

2. Light amplifier apparatus comprising an excitable medium of atoms, ions, or molecules, some of which have broad bands of energy levels corresponding to a broad band of absorption transitions and energy levels corresponding to at least one fluorescent emission transition; the upper energy levels of said broad bands being above the upper level of said fluorescent emission transition, some of the upper energy levels above the upper level of said fluoroscent emission transition being rapidly quenched via non-radiating transitions to the upper level of said fluorescent emission transition; and a bright pumping source of light energy for irradiating said medium to thereby excite at least a portion of said medium to produce an amplification region therein so that amplification of light by stimulated emission of radiation at a wavelength corresponding to said fluorescent emission transition takes place in said region; and means for conveying a stimulating light beam having a wavelength corresponding to said fluorescent emission transition through said amplification region.

3. Light amplifier apparatus as defined in claim 2 in which said bright pumping source is a source of broad band light energy.

4. Light amplifier apparatus as defined in claim 2 in which said medium is in a gaseous state.

5. Apparatus for light amplification as defined in claim 1 in which said bright pumping light source emits substantially no photon energy at a frequency substantially corresponding to the emitted light due to transitions from the higher state to the lower state.

6. Apparatus for light amplification as defined in claim 1 in which said medium is in a gaseous state.

7. Light amplifier apparatus as defined in claim 2 also including means to enable said medium to emit said light when stimulated by said stimulating light in a wave train that has a sharply rising intensity with an intensity rise time of less than approximately $10^{-7}$ seconds.

8. Apparatus for light amplification as defined in claim 1 in which said bright pumping light source is a gaseous discharge lamp.

9. Light amplifier apparatus as defined in claim 2 also including means for providing egress for amplified light from said bounded volume.

10. Apparatus for light amplification as defined in claim 1 also including means for providing egress for said emitted light from said bounded volume.

11. Light amplifier apparatus comprising an excitable medium of atoms, ions, or molecules, some of which have broad bands of energy levels corresponding to a broad band of absorption transitions and energy levels corresponding to at least one fluorescent emission transition; the upper energy levels of said broad bands being above the upper level of said fluorescent emission transition, some of the upper energy levels above the upper level of said fluorescent emission transition being rapidly quenched via non-radiating transitions to the upper level of said fluorescent emission transition, and the lower energy level corresponding to said fluorescent emission transition being relaxed by non-radiating transitions; and a bright pumping source of light energy for irradiating said medium to thereby excite at least a portion of said medium to produce an amplification region therein so that amplification of light by stimulated emission of radiation at a wavelength corresponding to said fluorescent emission transition takes place in said region; and means for conveying a stimulating light beam having a wavelength corresponding to said fluorescent emission transition through said amplification region.

12. Light amplifier apparatus as defined in claim 11 also including means for providing egress for amplified light from said bounded volume.

* * * * *

UNITED STATES PATENT OFFICE
CERTIFICATE OF CORRECTION

Patent No. 4,053,845   Dated Oct. 11, 1977

Inventor(s) Gordon Gould

It is certified that error appears in the above-identified patent and that said Letters Patent are hereby corrected as shown below:

Column 1, line 43, "Planok's" should be --Planck's--.

Column 2, lines 44-45, the formula should read $$N_h - N_1 > \frac{h}{8\pi^2 p^2 \tau Q}$$

Line 48 "T" should read --$\tau$--.

Lines 59-60, the formula should read $$N_h - N_1 \geq \frac{h}{4\pi^2 p^2 \tau Q_{unloaded}}$$

Column 6, line 36, the word "latter" should read --letter--.

Column 7, line 16, the word "amplfication" should read --amplification--.

Column 8, line 17, "XT" should read --KT--.

Line 21, "$(6^3 F_0)$" should read --$(6^3 P_0)$--.

UNITED STATES PATENT OFFICE
CERTIFICATE OF CORRECTION

Patent No. 4,053,845　　　　　　　　　Dated Oct. 11, 1977

Inventor(s) Gordon Gould

It is certified that error appears in the above-identified patent and that said Letters Patent are hereby corrected as shown below:

Column 15, lines 64-69, the expressions for the "COINCIDENT" ATOMIC SPECTRAL LINES in TABLE III should read as follows:

| | |
|---|---|
| $He(3^3P \rightarrow 2^3S)$ | $3889\text{Å} \approx Cs(8^3P_{3/2} \longleftrightarrow 6^3S_{1/2})3889\text{Å}$ |
| $Zn$ | $3303.7\text{Å} \approx Na(4^2P_{1/2} \longleftrightarrow 3^2S_{1/2})3303\text{Å}$ |
| $A$ | $8521.4\text{Å} \approx Cs(6^2P_{1/2} \longleftrightarrow 6^2S_{1/2})8521.2\text{Å}$ |

Column 16, lines 66-68, the portion of the equation reading $$\frac{P_{avail}}{1} \quad \text{should read} \quad \frac{P_{avail}}{h\nu}$$

Column 17, lines 2-3, the formula should read:

$$\frac{dn_1}{dt} = 0 = n_h A(h \rightarrow 1) - n_1 \gamma_c$$

Lines 8-9, the equation should read:

$$\frac{n_h}{n_1} = \frac{\gamma_c}{A(h \rightarrow 1)}$$

Column 17, line 28, the "$\geq$" should read --$\gtrsim$--.

UNITED STATES PATENT OFFICE
CERTIFICATE OF CORRECTION

Patent No. 4,053,845             Dated  Oct. 11, 1977

Inventor(s)  Gordon Gould

It is certified that error appears in the above-identified patent and that said Letters Patent are hereby corrected as shown below:

Column 18, line 43, "$\Upsilon = 2.5$" should read -- $\Upsilon \approx 1.5$ --.

Column 19, line 9, "medium" should read --mediums--.

Line 37, "are" should read --and--.

Line 45, "16" should read --7--.

Line 46-47, "421 and the description thereof." should read --421.--.

Column 20, line 46, "16" should read --7--.

Column 22, lines 37-38, "power broadshed" should read --power broadened--.

Column 23, lines 3-4, "LIGHT ENERGY MACHINING APPARATUS" should be deleted.

Signed and Sealed this

Thirty-first Day of October 1978

[SEAL]

Attest:

RUTH C. MASON
Attesting Officer

DONALD W. BANNER
Commissioner of Patents and Trademarks

REEXAMINATION CERTIFICATE (670th)
United States Patent [19]
Gould

[11] B1 4,053,845
[45] Certificate Issued Apr. 28, 1987

[54] OPTICALLY PUMPED LASER AMPLIFIERS

[76] Inventor: Gordon Gould, 329 E. 82 St., New York, N.Y. 10028

Reexamination Requests:
No. 90/000,253, Sep. 9, 1982
No. 90/000,254, Sep. 9, 1982
No. 90/000,336, Mar. 4, 1983

Reexamination Certificate for:
Patent No.: 4,053,845
Issued: Oct. 11, 1977
Appl. No.: 498,065
Filed: Aug. 16, 1974

Certificate of Correction issued Oct. 31, 1978.

Related U.S. Application Data

[60] Continuation of Ser. No. 644,035, Mar. 6, 1967, abandoned, and Ser. No. 804,540, Apr. 6, 1959, abandoned, said Ser. No. 644,034, is a division of said Ser. No. 804,540, and a continuation-in-part of Ser. No. 804,539, Apr. 6, 1959.

[51] Int. Cl.$^4$ ............... H01S 3/091; H01S 3/22
[52] U.S. Cl. ........................ 330/4.3; 372/55; 372/70; 372/91
[58] Field of Search ............ 372/51, 56, 55, 70, 372/91, 40; 324/304, 305

[56] References Cited

U.S. PATENT DOCUMENTS

| | | |
|---|---|---|
| 1,195,923 | 8/1916 | Gans . |
| 1,716,962 | 6/1929 | Johnson . |
| 1,815,733 | 7/1931 | Gulick . |
| 2,851,652 | 9/1958 | Dicke . |
| 2,884,524 | 4/1959 | Dicke . |
| 2,909,654 | 10/1956 | Bloembergen . |
| 2,929,922 | 3/1960 | Schawlow et al. . |
| 3,403,349 | 9/1968 | Wieder . |
| 3,609,570 | 9/1971 | Gould . |
| 3,614,653 | 10/1971 | Javan et al. . |

FOREIGN PATENT DOCUMENTS

| | | |
|---|---|---|
| 953271 | 4/1964 | United Kingdom . |
| 953272 | 4/1964 | United Kingdom . |
| 953273 | 4/1964 | United Kingdom . |
| 953274 | 4/1964 | United Kingdom . |
| 953275 | 4/1964 | United Kingdom . |
| 953276 | 4/1964 | United Kingdom . |
| 953721 | 4/1964 | United Kingdom . |

OTHER PUBLICATIONS

"Infrared and Optical Masers", A. L. Schawlow and C. H. Townes, Physical Review, vol. 112, Dec. 15, 1958, pp. 1940–1949.
"Infrared and Optical Masers", A. L. Schawlow and C. H. Townes, Preprint of 112 Physical Review 1940.
"Resonance And Quenching Of The Third Principal Series Line Of Caesium", C. Boeckner, Bureau of Standards Journal of Research, vol. 5, 1930, pp. 13–18.
"The Dazzle of Lasers", Newsweek, Jan. 3, 1983, pp. 36–40.
"Sun Guns", Omni, May 1982, pp. 61–64, 94–95.
"Solid State Optical Maser Using Divalent Samarium", P. P. Sorokin and M. J. Stevenson, IBM Journal of Research and Development, Jan. 1961, pp. 56–58.
"On the Quantum Theory of Radiation", A. Einstein, Physikalische Zeitschrift, vol. 18, 1917.
"Organic Laser Systems", A. Lempicki and H. Samelson, *Lasers*, vol. 1, Chapter 3, 1966, pp. 181–252.
"Infrared Fluorescence and Stimulated Emission of $Nd^{+3}$ in $CaWO_4$", L. F. Johnson and K. Nassau, Proceedings of IRE, Nov. 1961, pp. 1704–1706.
"Stimulated Infrared Emission From Trivalent Uranium", P. P. Sorokin and M. J. Stevenson, Physical Review Letters, Dec. 15, 1960, pp. 557–559.
"Crystalline Solid Lasers", Z. J. Kiss and R. J. Pressley, Proceedings of IEEE, vol. 54, Oct. 1966, pp. 1236–1248.
General Electric Price Schedule, Form 2115, Re Na–1 Sodium Lamp, Feb. 1, 1960 (Supercedes Form 2115 dated Jul. 1, 1957).
*Introduction to Lasers and Their Applications*, D. C. O'Shea et al., 1977, pp. 13–14.
*Lamps and Lighting*, S. T. Henderson and A. M. Marsden, 1972, Chapter 13, Sodium Lamps, pp. 234–249.
"Incoherent Optical Sources", I. Liberman, *Handbook of Lasers*, 1971, pp. 13–38.

(List continued on next page.)

*Primary Examiner*—Harvey E. Behrend

[57] ABSTRACT

Optically pumped laser amplifiers are disclosed. One type of such amplifier utilizes an excitable medium, the atoms, ions or molecules of said medium having well defined energy states including a lowest state, a lower state above said lowest state, and a higher state above said lower state, and a bright pumping light source composed of a radiative substance different from such medium which radiative substance emits energy in a spectral range which can be absorbed by such medium, and wherein the major portion of the energy absorbed by such medium causes transitions of the atoms, ions, or molecules thereof to populate the higher state. Another type of such amplifier utilizes a medium of atoms, ions, or molecules, some of which have broad bands of energy levels corresponding to a broad band of absorption transitions and energy levels corresponding to at least one fluorescent emission transition, the upper energy levels of said broad bands being above the upper level of said fluorescent emission transition, and wherein some of the upper energy levels above the upper level of said fluorescent emission transition are rapidly quenched via non-radiating transitions to the upper level of said fluorescent emission transition. In a preferred embodiment of the latter amplifier, the lower energy level corresponding to the fluorescent emission transition is relaxed by non-radiating transitions.

OTHER PUBLICATION

"The 'Speckle' On A Surface Lit By Laser Light Can Be Seen With Other Kinds Of Illumination", The Amateur Scientist, J. Walker, Scientific American, vol. 246, No. 2, Feb. 1982, pp. 162-169.

"High-Pressure Sodium Discharge Arc Lamps", W. C. Louden and K. Schmidt, Illuminating Engineering, vol. LX, No. 12, Dec. 1965, pp. 696-702.

*Practical Spectroscopy*, G. R. Harrison, R. C. Lord, and J. R. Loofbourow, 1948, (selected pages).

"Pulsed Alkali-Vapor Lamps", J. E. Creedon, W. Bayha and S. Schneider, Research and Development Technical Report ECOM-3051, Dec. 1968, AD 680846, United States Army Electronics Command, Fort Monmouth, N.J.

"A Tunable Laser Using Organic Dye Is Made At Home For Less Than $75", The Amateur Scientist, C. L. Stong, Scientific American, vol. 222, No. 2, Feb. 1970, pp. 116-120.

"Organic Lasers", P. Sorokin Scientific American, vol. 220, No. 2, Feb. 1969, pp. 30-40.

*Reference Data for Radio Engineers*, Third Edition, Federal Telephone and Radio Corporation, 1949, p. 90.

"Flashlamp-Pumped Organic-Dye Lasers", P. P. Sorokin, J. R. Lankard, V. L. Moruzzi, and E. C. Hammond, Journal of Chemical Physics, vol. 48, No. 10, May 15, 1968, pp. 4726-4741.

"Frequency- And Time-Dependent Gain Characteristics of Laser- and Flashlamp-Pumped Dye Solution Lasers", M. Bass, T. F. Deutsch, and M. J. Weber, Applied Physics Letters, vol. 13, No. 4, Aug. 15, 1968, pp. 120-124.

"Organic Dye Lasers", Morton R. Kagan, Gerald I. Farmer and Bernard G. Huth, Laser Focus, Sep. 1968, pp. 26-33.

"A-2—Experimental Measurement of the Critical Population Inversion for the Dye Solution Laser", B. B. Snavely and O. G. Peterson, IEEE Journal of Quantum Electronics, vol. QE-4, No. 10, Oct. 1968, pp. 540-545.

"Time Dependent Spectroscopy Of Flashlamp Pumped Dye Lasers", H. Furumoto and H. Ceccon, Applied Physics Letters, vol. 13, No. 10, Nov. 15, 1968, pp. 335-337.

"Lasers Based On Solutions Of Organic Dyes", B. I. Stepanov and A. N. Rubinov, Soviet Physics Uspekhi, vol. 11, No. 3, Nov.-Dec. 1968, pp. 304-319.

General Electric Lamp Bulletin LD-1, Jan., 1956.

"Frequency- and Time-Dependent Gain Characteristics of Dye Lasers", Marvin J. Weber and Michael Bass, IEEE Journal Of Quantum Electronics, vol. QE-5, No. 4, Apr. 1969, pp. 175-188.

*Dye Lasers*, F. P. Schafer, Topics in Applied Physics, vol. 1, Second Edition, 1977, (selected pages).

"Flashlamp-Excited Organic Dye Lasers", Benjamin B. Snavely, Proceedings Of The IEEE, vol. 57, No. 8, Aug. 1969, pp. 1374-1390.

"Gas Lasers", C. K. N. Patel, *Lasers*, vol. 2, Chapter 1, 1968, pp. 1-36.

*Gas Lasers*, C. G. B. Garrett, 1967, pp. 59-62.
*The Laser*, W. V. Smith and P. P. Sorokin, 1966, Chapters 2 and 5.

"Stimulated Emission Observed from an Organic Dye, Chloro-aluminum Phthalocyanine", P. P. Sorokin and J. R. Lankard, IBM Journal, Mar. 1966, pp. 162-163.

"Possibility Of Obtaining Negative Temperature In Atoms By Electron Impact", A. Javan, Quantum Electronics Conference, Sep. 14-16, 1959, pp. 564-571.

"Coherent Light Amplification in Cs Vapor", S. Jacobs, G. Gould and P. Rabinowitz, TRG, Syosset, N.Y.

'Laser-pumped Stimulated Emission from Organic Dyes: Experimental Studies and Analytical Comparisons", P. P. Sorokin, J. R. Lankard, E. C. Hammond, and V. L. Moruzzi, IBM Journal, Mar. 1967, pp. 130-148.

"Emission Spectrum Of Rhodamine B Dye Lasers", T. F. Deutsch, M. Bass, and P. Meyer, and S. Protopapa, Applied Physics Letters, vol. 11, No. 12, Dec. 15, 1967, pp. 379-381.

"New Dye Lasers Covering The Visible Spectrum", F. P. Schafer, W. Schmidt and K. Marth, Physics Letters, vol. 24A, No. 5, Feb. 27, 1967, pp. 280-281.

"Inversion Mechanism in Gas Lasers", W. R. Bennett, Jr., Applied Optics, Supplement 2: Chemical Lasers, 1965, pp. 3-33.

"Population Inversion And Continuous Optical Maser Oscillation In A Gas Discharge Containing A He-Ne Mixture", A. Javan, W. R. Bennett, Jr., and D. R. Herriott, Physical Review Letters, vol. 6, No. 3, Feb. 1, 1961, pp. 106-110.

"Laser Work At Technical Research Group", G. Gould and L. Goldmuntz, National Aerospace Electronics Conference, May 14-16, 1962, pp. 190-193.

"Alkalai Vapor Infrared Masers", C. H. Townes et al., Advances in Quantum Electronics, Mar. 23-25, 1961, pp. 12-17.

"Coherent Light Amplification In Optically Pumped Cs Vapor", S. Jacobs, G. Gould and P. Rabinowitz, Physical Review Letters, vol. 7, No. 11, Dec. 1, 1961, pp. 415-417.

*Industrial Applications of Lasers*, J. F. Ready, 1978, Chapter 14, pp. 358-366.

"Laser Oscillations In Nd-Doped Yttrium Aluminum, Yttrium Gallium, and Gadolinium Garnets", J. E. Geusic et al., Applied Physics Letters, vol. 4, No. 10, May 15, 1964, pp. 182-184.

*Lasers*, B. A. Lengyel, 1971, pp. 39-59.

"Liquid Lasers: Promising Solutions", H. Samelson, Electronics, Nov. 11, 1968, pp. 142-147.

"Fine Structure and Properties of Chromium Fluorescence in Aluminum and Magnesium Oxide", A. L. Schawlow, Advances in Quantum Electronics, Mar. 23-25, 1961, pp. 50-64.

"Optical Maser Action of $Nd^{+3}$ In A Barium Crown Glass", E. Snitzer, vol. 7, No. 12, Dec. 15, 1961, pp. 444-446.

"Optical and Laser Properties of $Nd^{+3}$ and $Eu^{+3}$ Doped $YVO_4$", J. R. O'Connor, Transactions of Metallurgical Society of AIME, vol. 239, Mar. 1967, pp. 362-365.

"Fluorescence and Stimulated Emission from Trivalent Europium in Yttrium Oxide", N. C. Chang, Journal of Applied Physics, vol. 34, No. 12, Dec. 1963, pp. 3500-3504.

(List continued on next page.)

OTHER PUBLICATION

"Advances In Laser Technology", Gordon Gould, post 1971, pp. 85-93.

"Optically Pumped Pulsed Crystal Lasers Other Than Ruby", L. F. Johnson, *Lasers*, vol. 1, Chapter Two, 1966, pp. 137-180.

"Simultaneous Optical Maser Action In Two Ruby Satellite Lines", A. L. Schawlow et al., Physical Review Letters, vol. 6, No. 3, Feb. 1, 1961, pp. 96-98.

"Light of the 21st Century", NOVA, Public Television, 1978, p. 15.

"Optical Detection Of Paramagnetic Resonance In An Excited State Of $Cr^{3+}$ In $Al_2O_3$", A. L. Schawlow et al., Physical Review Letters, vol. 3, No. 12, Dec. 15, 1959, pp. 545-548.

"Electronic Spectra Of Exchange-Coupled Ion Pairs In Crystals", A. L. Schawlow et al., Physical Review Letters, vol. 3, No. 6, Sep. 15, 1959, pp. 271-273.

"Laser Survey", S. Rothberg, TRG Technical Note #48, May 11, 1962, pp. 1-4.

"Payday For The Laser's Creator", Business Week, Dec. 14, 1981, p. 122B.

"A Study of the Line Spectrum of Sodium as Excited by Fluorescence", Hon. R. J. Strutt, Proceedings of Royal Society of London, vol. XCVI, Feb. 1920, pp. 272-287.

"Laser Action in Rare Earth Chelates", A. Lempicki, H. Samelson, and C. Brecher, Applied Optics, Supplement 2: Chemical Lasers, 1965, pp. 205-213.

"Lasers Action In Liquids", A. Heller Physics Today, vol. 20, Nov. 1967, pp. 35-41.

*Resonance Radiation and Excited Atoms*, A. C. G. Mitchell and M. W. Zemansky, 1934 (selected pages).

*Molecular Spectra and Molecular Structure*, G. Herzberg, 1950, p. 122.

"The Excitation Of Sodium By Ionized Mercury Vapor", H. W. Webb and S. C. Wang, Physical Review, vol. 33, Mar. 1929, pp. 329-340.

*Atomic Spectra and Atomic Structure*, G. Herzberg, 1944, p. 72.

"Continuous Optically Pumped Cs Laser", P. Rabinowitz, S. Jacobs and G. Gould, Applied Optics, vol. 1, No. 4, Jul. 1960, pp. 513-516.

"Solid-State, High-Intensity Monochromatic Light Sources", I. Wieder, Review of Scientific Instruments, vol. 30, No. 11, Nov. 1959, pp. 995-996.

"Slow Spin Relaxation Of Optically Polarized Sodium Atoms", H. G. Dehmelt, Physical Review, vol. 105, No. 5, Mar. 1, 1957, pp. 1487-1489.

"Some Microwave-Optical Experiments In Ruby", I. Wieder, Quantum Electronics Conference, Sep. 14-16, 1959, pp. 105-109.

"Atomic Orientation by Optical Pumping", W. Franzen and H. G. Emslie, vol. 108, No. 6, Dec. 15, 1957, pp. 1453-1458.

"A Possible Limitation On Optical Pumping In Solids", I. Wieder, Ann Arbor Conference on Optical Pumping, Jun. 15-18, 1959, pp. 133-138.

"A Microwave Frequency Standard Employing Optically Pumped Sodium Vapor", W. E. Bell, A. Bloom, R. Williams, IRE Transactions on Microwave Theory and Techniques, Jan. 1959, pp. 95-98.

"Optically Detected Field-Independent Transition In Sodium Vapor", W. E. Bell and A. L. Bloom, vol. 109, Jan. 1, 1958, pp. 219-220.

"K13. Optically Detected Magnetic Resonance in Rubidium Vapor", W. E. Bell and A. L. Bloom, Bulletin of American Physical Society, Ser. II. vol. 2, No. 8, Dec. 19, 1957, p. 384.

"K14. Optically Detected Hyperfine Resonances in Potassium Vapor", A. L. Bloom and W. E. Bell, Bulletin of American Physical Society, Ser. II, vol. 2, No. 8, Dec. 19, 1957, p. 384.

"J3. Optical Detection of the Cesium Hyperfine Splitting", E. C. Beaty and P. L. Bender, Bulletin of American Physical Society, Ser. II, vol. 3, No. 3, May 1, 1958, p. 185.

Press Release and Speech by T. H. Maiman as to Achievement of Ruby Laser, Jul. 7, 1960.

General Electric Bulletin TP-109R, "High Intensity Discharge Lamps", 1975.

"Stimulated Optical Emission In Fluorescent Solids, I. Theoretical Considerations, II. Spectroscopy And Stimulated Emission In Ruby", T. H. Maiman et al, Physical Review, Vol. 123, August 15, 1961, pp. 1145-1157.

"Molecular Generator And Amplifier", N. G. Basov and A. M. Prokhorov, Uspekhi Fizicheskikh Nauk, Vol. 57, No. 3, 1955, pp. 485-501.

"Optical Methods of Atomic Orientation and of Magnetic Resonance", A. Kastler, Journal of Optical Society of America, Vol. 47, No. 6, June 1957, pp. 460-465.

Bibliography of Articles Pertinent to Laser Program at TRG, Contract no. AF 49 (638)-673, Report No. TRG-134-TR-3, July 23, 1960, pp. 208-236.

"Stimulated Optical Radiation in Ruby", T. H. Maiman, Nature, August 6, 1960, pp. 493-494.

"Optical Maser Action in Ruby", T. H. Maiman, British Communications and Electronics, September 1960, pp. 674-675.

"hfs Separations and hfs Anomaly in the $6^2P_{3/2}$ Metastable Level of $Tl^{203}$ and $Tl^{205}$", Gordon Gould, Physical Review, Vol. 101, January 1-March 15, 1956, pp. 1828-1829.

"Optical Pumping", A. L. Bloom, Scientific American, October 1960, pp. 72-80, 220.

"Scalpels of Light", Life, May 1982, pp. 129-134.

"Molecular Microwave Oscillator and New Hyperfine Structure in the Microwave Spectrum of $NH_3$", J. P. Gordon, H. J. Zeiger and C. H. Townes, Physical Review, Vol. 95, 1954 pp. 282-284.

"Possible Methods of Obtaining Active Molecules for a Molecular Oscillator", N. G. Basov and A. M. Prokhorov, Soviet Physics JETP, Vol. 1, July 1955, pp. 184-185.

"The Maser—New Type of Microwave Amplifier, Frequency Standard, and Spectrometer", J. P. Gordon, H. J. Zeiger, and C. H. Townes, Physical Review, Vol. 99, 1955, pp. 1264-1274.

"Molecular Amplification and Generation of Microwaves", J. P. Wittke, Proceedings of IRE, March 1957, pp. 291-316.

*Fluorescence And Phosphorescence*, P. Pringsheim, 1949 (selected pages).

(List continued on next page.)

OTHER PUBLICATION

C. Boeckner, "Resonance and Quenching of the Third Principle Series Line of Cesium", Bureau of Standards Journal of Research, 5, 13, (1930)

G. H. Dieke and Shoba Singh, "Absorption, Fluorescence and Energy Levels of the Dysprosium Ion", Journal of the Optical Society of America, 46(7), 495 (1956)

A. L. Schawlow and C. H. Townes, preprint of "Infrared and Optical Masers", Physical Review, 112, 1940, (1958), preprint distribution beginning in the summer of 1958.

A. L. Schawlow and C. H. Townes, "Infrared and Optical Masers", Physical Review, 112, 1940, (Dec. 15, 1958).

"Stimulated Emission from $Ho^{3+}$ at 2 microns in $HoF_3$, D.P. Devor et al., Applied Physics Letters, 18(4), 122 (1971).

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *